US012159363B2

(12) United States Patent
Aljubeh et al.

(10) Patent No.: US 12,159,363 B2
(45) Date of Patent: Dec. 3, 2024

(54) COMPUTER VISION TOOLS FOR CREATING AUGMENTED REALITY (AR) MODELS

(71) Applicant: Snap Inc., Santa Monica, CA (US)

(72) Inventors: Marwan Aljubeh, London (GB); Gregory James Bakker, Clapham (GB); Ross Cairns, London (GB); Eric Nersesian, Summit, NJ (US)

(73) Assignee: Snap Inc., Santa Monica, CA (US)

( * ) Notice: Subject to any disclaimer, the term of this patent is extended or adjusted under 35 U.S.C. 154(b) by 76 days.

(21) Appl. No.: 18/062,423

(22) Filed: Dec. 6, 2022

(65) Prior Publication Data

US 2023/0177789 A1 Jun. 8, 2023

Related U.S. Application Data

(60) Provisional application No. 63/286,433, filed on Dec. 6, 2021, provisional application No. 63/368,600, filed on Jul. 15, 2022.

(51) Int. Cl.
*G06T 19/20* (2011.01)
*G06F 3/0482* (2013.01)
(Continued)

(52) U.S. Cl.
CPC .............. *G06T 19/20* (2013.01); *G06T 7/579* (2017.01); *G06T 7/70* (2017.01); *G06T 19/006* (2013.01);
(Continued)

(58) Field of Classification Search
CPC ..... G06T 19/20; G06T 7/579; G06T 2200/08; G06T 2200/24; G06T 2219/2004;
(Continued)

(56) References Cited

U.S. PATENT DOCUMENTS 6,009,190 A 12/1999 Szeliski et al.
6,525,731 B1 2/2003 Suits et al.
(Continued)

FOREIGN PATENT DOCUMENTS

CN 113366413 9/2021
EP 3846124 7/2021
(Continued)

OTHER PUBLICATIONS

"Landmarker Guide—Lens Studio by Snap Inc.", [[Online] Retrieved from the Internet: <URL: https://lensstudio.snapchat.com/templates/landmarker/guide/>, (Dec. 5, 2021), 20 pgs.
(Continued)

*Primary Examiner* — Jeffery A Brier
(74) *Attorney, Agent, or Firm* — Schwegman Lundberg & Woessner, P.A.

(57) ABSTRACT

A method for interacting with a user to create a three-dimensional (3D) model is provided. The method may include causing a capture device to start a first scan on a reference surface; instructing the user to make a first movement during the first scan; generating a 3D data representation of the reference surface based on data acquired in the first scan; displaying the 3D data representation on the GUI; causing the capture device to start a second scan on the reference surface; instruct the user to make a second movement during the second scan; generating a location tracking data representation of the reference surface based on data acquired in the second scan; displaying the location tracking data representation on the GUI; and causing the capture device to generate a 3D model of the reference surface based on the 3D data representation and the location tracking data representation.

20 Claims, 24 Drawing Sheets

(51) Int. Cl.
*G06T 7/579* (2017.01)
*G06T 7/70* (2017.01)
*G06T 19/00* (2011.01)

(52) U.S. Cl.
CPC ........ *G06F 3/0482* (2013.01); *G06T 2200/08* (2013.01); *G06T 2200/24* (2013.01); *G06T 2219/2004* (2013.01)

(58) Field of Classification Search
CPC ........ G06T 7/70; G06T 19/006; G06T 17/00; G06T 2207/10016; G06T 2207/10028; G06T 7/55; G06F 3/0482
See application file for complete search history.

(56) References Cited

U.S. PATENT DOCUMENTS

| | | |
|---|---|---|
| 9,652,896 B1 | 5/2017 | Jurgenson et al. |
| 9,984,499 B1 | 5/2018 | Jurgenson et al. |
| 10,290,049 B1 | 5/2019 | Xu et al. |
| 10,657,708 B1 | 5/2020 | Jurgenson et al. |
| 10,810,782 B1 | 10/2020 | Cowburn et al. |
| 10,997,760 B2 | 5/2021 | Berger et al. |
| 11,107,255 B2 | 8/2021 | Li et al. |
| 11,176,737 B2 | 11/2021 | Hare et al. |
| 2004/0095357 A1 | 5/2004 | Oh et al. |
| 2005/0001852 A1 | 1/2005 | Dengler et al. |
| 2007/0043616 A1 | 2/2007 | Kutaragi et al. |
| 2011/0170768 A1 | 7/2011 | Alldrin et al. |
| 2012/0058782 A1 | 3/2012 | Li |
| 2012/0195471 A1 | 8/2012 | Richard et al. |
| 2012/0196679 A1 | 8/2012 | Newcombe et al. |
| 2012/0212509 A1 | 8/2012 | Benko et al. |
| 2012/0306850 A1 | 12/2012 | Balan et al. |
| 2013/0044128 A1 | 2/2013 | Liu et al. |
| 2013/0155058 A1 | 6/2013 | Golparvar-fard et al. |
| 2014/0206443 A1 | 7/2014 | Sharp et al. |
| 2015/0077427 A1 | 3/2015 | Dumitras et al. |
| 2015/0145865 A1 | 5/2015 | Barnett et al. |
| 2016/0140757 A1 | 5/2016 | Voth |
| 2016/0210761 A1 | 7/2016 | Pollefeys et al. |
| 2016/0266386 A1 | 9/2016 | Scott et al. |
| 2016/0350833 A1* | 12/2016 | Andon ............... G06Q 30/0631 |
| 2016/0350930 A1 | 12/2016 | Lin et al. |
| 2016/0371884 A1 | 12/2016 | Benko et al. |
| 2017/0124713 A1 | 5/2017 | Jurgenson et al. |
| 2017/0249752 A1 | 8/2017 | Kotake |
| 2017/0278289 A1 | 9/2017 | Marino et al. |
| 2018/0005015 A1 | 1/2018 | Hou et al. |
| 2018/0103209 A1* | 4/2018 | Fischler ................. H04N 23/64 |
| 2018/0190032 A1 | 7/2018 | Barnett et al. |
| 2018/0210628 A1 | 7/2018 | Mcphee et al. |
| 2018/0246515 A1 | 8/2018 | Iwama et al. |
| 2019/0028637 A1 | 1/2019 | Kolesov et al. |
| 2019/0043203 A1 | 2/2019 | Fleishman et al. |
| 2019/0073832 A1 | 3/2019 | Kim |
| 2019/0108396 A1 | 4/2019 | Dal Mutto et al. |
| 2019/0147220 A1 | 5/2019 | Mccormac et al. |
| 2019/0156534 A1 | 5/2019 | Chen et al. |
| 2019/0258058 A1 | 8/2019 | Fortin-Deschênes et al. |
| 2019/0377981 A1 | 12/2019 | Veeravasarapu et al. |
| 2020/0020118 A1* | 1/2020 | Chapdelaine-Couture ................. G06T 7/74 |
| 2020/0111267 A1 | 4/2020 | Stauber et al. |
| 2020/0126300 A1 | 4/2020 | Song et al. |
| 2020/0221070 A1 | 7/2020 | Godar |
| 2020/0250858 A1 | 8/2020 | Li et al. |
| 2020/0250889 A1 | 8/2020 | Li |
| 2020/0302681 A1 | 9/2020 | Totty et al. |
| 2020/0312008 A1 | 10/2020 | Cowburn et al. |
| 2020/0334824 A1 | 10/2020 | Bleyer et al. |
| 2020/0368616 A1 | 11/2020 | Delamont |
| 2021/0012551 A1 | 1/2021 | Cowburn et al. |
| 2021/0150719 A1 | 5/2021 | Cowburn et al. |
| 2021/0199460 A1 | 7/2021 | Yerli |
| 2021/0200776 A1 | 7/2021 | Pounds et al. |
| 2021/0203727 A1 | 7/2021 | Pounds et al. |
| 2021/0334993 A1 | 10/2021 | Woodford |
| 2021/0343050 A1 | 11/2021 | Li et al. |
| 2022/0392167 A1 | 12/2022 | Adkinson et al. |
| 2023/0177788 A1 | 6/2023 | Aljubeh et al. |
| 2024/0013415 A1 | 1/2024 | Tam et al. |
| 2024/0020920 A1 | 1/2024 | Aljubeh et al. |

FOREIGN PATENT DOCUMENTS

| | | |
|---|---|---|
| WO | 2020160245 | 8/2020 |
| WO | 2020160261 | 8/2020 |
| WO | 2020205435 | 10/2020 |
| WO | 2023107932 | 6/2023 |
| WO | 2024015917 | 1/2024 |

OTHER PUBLICATIONS

Arefin, Mohammed Safayet, "Effects of a Distracting Background and Focal Switching Distance in an Augmented Reality System", IEEE International Symposium on Mixed and Augmented Reality Adjunct (ISMAR-Adjunct). IEEE ISMAR, (2021), 96-99.

Barde, Amit, "Less is More: Using Spatialized Auditory and Visual Cues for Target Acquisition in a Real-World Search Task", IEEE International Symposium on Mixed and Augmented Reality Adjunct (ISMAR-Adjunct). IEEE ISMAR, (2019), 340-341.

Campbell, John L, "Coding In-depth Semistructured Interviews: Problems of Unitization and Intercoder Reliability and Agreement", Sociological Methods and Research, 42(3), (2013), 294-320.

Choudhary, Siddharth, "SLAM with Object Discovery, Modeling and Mapping", 2014 IEEE RSJ International Conference on Intelligent Robots and Systems, (2014), 8 pgs.

Czadzeck, Cameron, "Social Media Marketers: Here's Why Augmented Reality Matters", Optic Sky Productions, [Online] Retrieved from the Internet: <URL: https://web.archive.org/web/20211023234742/https://opticskypro.com/updates/social-media-marketers-heres-why-augmented-reality-matters/>, (Sep. 1, 2021), 8 pgs.

Elgendy, Mohamed, "Deep Learning for Vision Systems", Manning, New York, NY, USA, (2020), 480 pgs.

Feng, Qiaojun, "Localization and Mapping using Instance-specific Mesh Models", 2019 IEEE RSJ International Conference on Intelligent Robots and Systems (IROS), (2019), 7 pgs.

Lu, Weiquan, "Subtle Cueing for Visual Search in Augmented Reality", IEEE International Symposium on Mixed and Augmented Reality (ISMAR). IEEE ISMAR, (2012), 161-166.

Reitmayr, Gerhard, "Simultaneous Localization and Mapping for Augmented Reality", 2010 IEEE International Symposium on Ubiquitous Virtual Reality, (Jul. 2010), 5 pgs.

Syiem, Brandon Victor, "Impact of Task on Attentional Tunneling in Handheld Augmented Reality", CHI Conference on Human Factors in Computing Systems (CHI '21), SIGCHI, (2021), 14 pgs.

Wang, Chieh-Chih, "Simultaneous Localization, Mapping and Moving Object Tracking", The International Journal of Robotics Research, 26(9), (2007), 47 pgs.

"International Application Serial No. PCT/US2022/081002, International Search Report mailed Apr. 13, 2023", 3 pgs.

"International Application Serial No. PCT/US2022/081002, Written Opinion mailed Apr. 13, 2023", 7 pgs.

"International Application Serial No. PCT/US2022/081002, Response to Written Opinion and Article 34 Amendments filed Oct. 5, 2023", 15 pgs.

"Application Serial No. PCT/US2022/081002, Written Opinion Mailed Nov. 16, 2023", 9 pgs.

"International Application Serial No. PCT/US2023/070147, International Search Report mailed Nov. 29, 2023", 5 pgs.

"International Application Serial No. PCT/US2023/070147, Written Opinion mailed Nov. 29, 2023", 6 pgs.

"U.S. Appl. No. 18/062,393, Preliminary Amendment filed Jan. 3, 2024", 7 pgs.

"International Application Serial No. PCT/US2022/081002, Response to Written Opinion filed Jan. 12, 2024", 5 pgs.

(56) References Cited

OTHER PUBLICATIONS

"International Application Serial No. PCT/US2022/081002, International Preliminary Report on Patentability mailed Mar. 18, 2024", 11 pgs.

Chew, W, "Dynamic Strategy of Keyframe Selection with PD Controller for VSLAM Systems", IEEE Asme Transactions On Mechatronics Institute Of Electrical And Electronics Engineers Inc. USA vol. 27, No. 1, (Feb. 1, 2022), 115-125.

Juichung, Kuo, "Redesigning SLAM for Arbitrary Multi-Camera Systems", ARXIV.ORG, Cornell University Library, 201 Olin Library Cornell University Ithaca, NY 14853, (Mar. 4, 2020), 7 pgs.

"U.S. Appl. No. 18/062,393, Non Final Office Action mailed Oct. 10, 2024", 10 pgs.

\* cited by examiner

COMPUTER VISION TOOLS FOR CREATING AUGMENTED REALITY (AR) MODELS

CROSS-REFERENCE TO RELATED APPLICATION

This application claims priority from U.S. Provisional Patent Application No. 63/286,433, filed Dec. 6, 2021, and entitled "3D Models for Augmented Reality (AR)" and from U.S. Provisional Patent Application No. 63/368,600, filed Jul. 15, 2022, and entitled "Incremental Scanning for Custom Landmarkers," each of which are herein incorporated by reference in their entireties.

BACKGROUND

Augmented reality (AR) may include using computer-generated enhancements to add new information to images in a real-time or near real-time fashion. For example, images of a real-world object on a display of a device may be enhanced with display details that are not present on the object but that are generated by an AR system to appear as if they are on or part of the object. AR systems require a complex mix of image capture information that is integrated and matched with the AR information that is to be added to a captured scene in a way that seeks to seamlessly present a final image from a perspective determined by the image capture device.

Various technologies may be used in AR rendering, including optical projection systems, monitors, handheld devices, and display systems worn on the human body, such as eyeglasses, contact lenses, or a head-up display (HUD).

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 2:
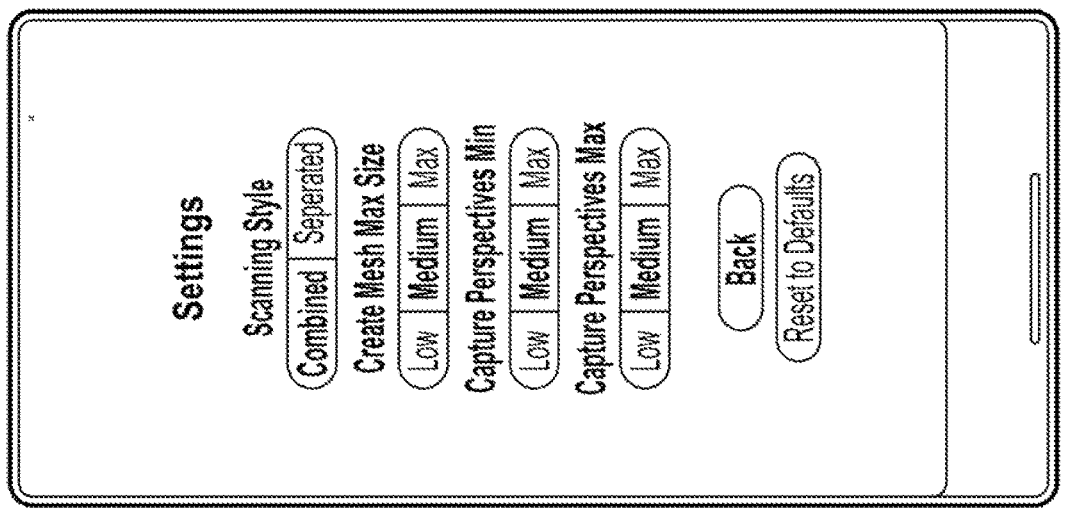
FIG. 2 illustrates a graphical user interface of a setting page, according to some examples.

Examples relate to methods and systems that provide user with computer vision tools for creating three-dimensional (3D) models (also called "custom landmarkers" or "custom locations") usable for augmented reality (AR) experiences out of static features or objects in the world (e.g., building, storefronts, statues). These 3D models are then available in an authoring tool for creating AR experiences, which are shared with end-users as AR augmentations (e.g., "lenses").

For example, a user may scan a target static feature or object using a two-step process. First, an object scan results in two outputs:

a. A Simultaneous Localization And Mapping (SLAM) tracking model (as an example of a location tracking data representation or a computer vision (CV) model), and b. a 3D mesh model (as an example of a 3D data representation), The SLAM tracking model and the 3D mesh may be aligned with each other using a SLAM tracking system. In some examples, the SLAM tracking model and the 3D mesh may together constitute a 3D model of features or objects. The user may have an option of testing a scanning result and previewing sample applications on the scanning result. The user may also be able to upload the scanning result (e.g., the SLAM tracking model and the 3D mesh)

In some examples, the CV model is primary to the process and the 3D mesh model is secondary for visualization processes of the physical surfaces. The described processes may be implemented primarily as a CV workflow using the camera's images to record features and keyframes and secondly for the LiDAR sensor to record depth information to build the 3D mesh model. In some examples, the CV model and the 3D mesh model may be given equal weight in an overall process, and in some examples the 3D mesh model may be the primary output of a process. Example systems and methods enable augmentation creators to create their own 3D reference models, which they can load into the augmentation creation application and publish as augmentations.

In some examples, the types of structures supported by custom 3D reference models may be near-range where the scanning leverages Laser Imaging, Detection, and Ranging (LIDAR) as part of 3D reference model creation. For example, LIDAR may have a range limitation of a few meters.

FIG. 1-FIG. 17 show graphical user interfaces for creating a custom landmarker. Specifically, FIGS. 3-5 relate to a 3D scanning process, FIGS. 6-8 relate to an area mapping process, FIGS. 9-11 relate to a testing process, FIGS. 12-14 relate to a publishing (uploading) process, and FIGS. 16-17 relates to a loading process. The area mapping process and the 3D scanning process may be performed in any order. In some examples, either the area mapping process or the 3D scanning process is omitted.

An augmentation creator (e.g., the scanner user) may access the "custom 3D reference model creator" augmentation utility of the application 2806. Through the augmentation creation process, the creator uses the LIDAR-enabled phone to create a map (e.g., composed of 3D Markers and 3D mesh) of a suitable target (e.g., a public statue or a storefront).

In the area mapping process, a creator is instructed to build a map of an area surrounding a custom 3D reference model (e.g., a target structure or object). In the 3D scanning process, the creator is instructed to perform a 3D scan of the 3D reference model. During scanning, the creator provides feedback as to the quality and completeness of the ongoing scan. After the scanning is finished, the creator is instructed to test the quality of the scan results (e.g., meshes, perspectives).

After finishing the area mapping process and the 3D scanning process, a creator can upload the 3D reference model to a server. The creator may view and load his/her uploaded model. The creator may also download others' models.

Figure 1:
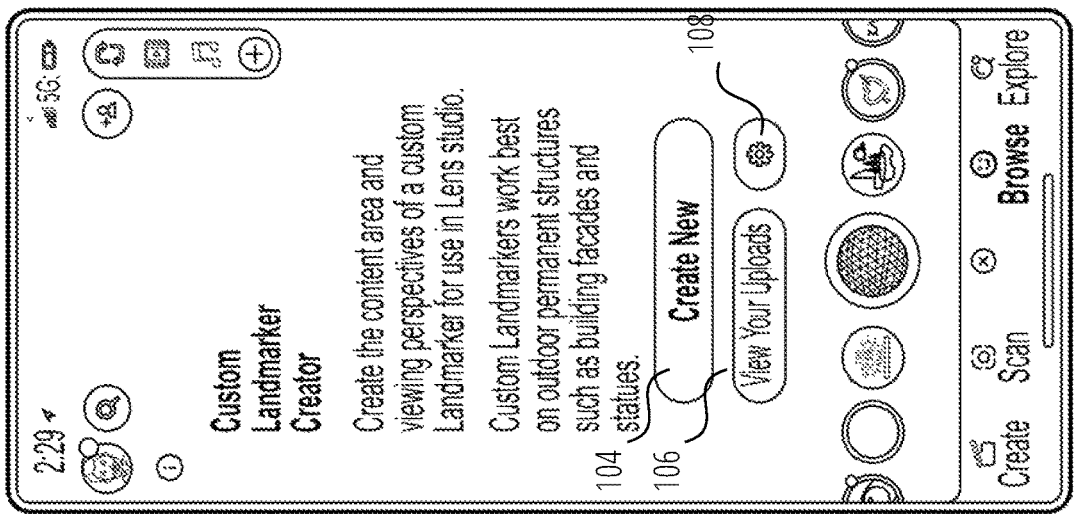
FIG. 1 illustrates a graphical user interface of a homepage, according to some examples.

FIG. 1 illustrates a graphical user interface (GUI) 102 of a homepage, according to some examples. The GUI 102 may be an initial GUI before beginning the example processes in the present disclosure. For example, when a user executes an application (APP) (e.g., application 2806) for creating a custom AR landmarker/location (also referred to as a custom 3D model or a 3D model), the GUI 100 is the first GUI shown on a display of a user device by the APP. In some examples, creating a custom AR landmarker/location is a function or module embedded in the APP. A user may run the function or module by clicking on certain virtual buttons displayed on the user device.

Figure 16:
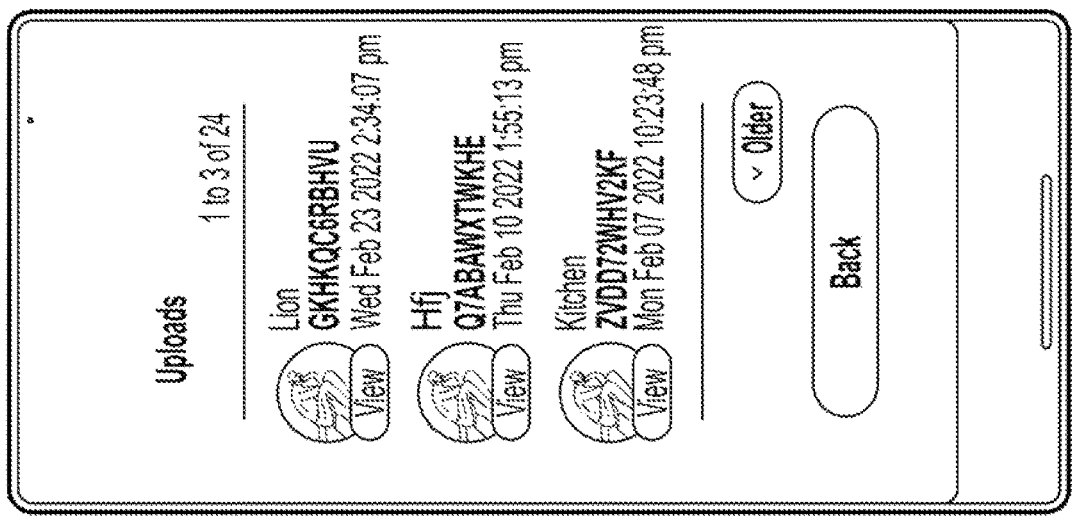
FIG. 16 illustrates a graphical user interface of a list of uploaded AR landmarkers/locations, according to some examples.

As shown in FIG. 1, the GUI 102 may include various visual representations. The various visual representations include multiple images or icons corresponding to a user and one or more icons corresponding to different functions of the APP, such as searching for a user, adding friends, sharing contents, changing a lens, etc. The visual representations may also include a virtual button 104 for creating a new landmarker, a virtual button 106 for viewing uploaded AR land markers/locations, and a virtual button 108 for setting parameters for creating the landmarker. When a user presses the virtual button 104, the process of creating an AR landmarker/location begins, and a GUI 302 in FIG. 3 is displayed. When a user presses the virtual button 106, the process of viewing uploaded AR landmarkers/locations begins and a GUI 1602 in FIG. 16 is displayed. When a user presses the virtual button 108, a GUI 202 of a setting page in FIG. 2 is displayed.

Figure 3:
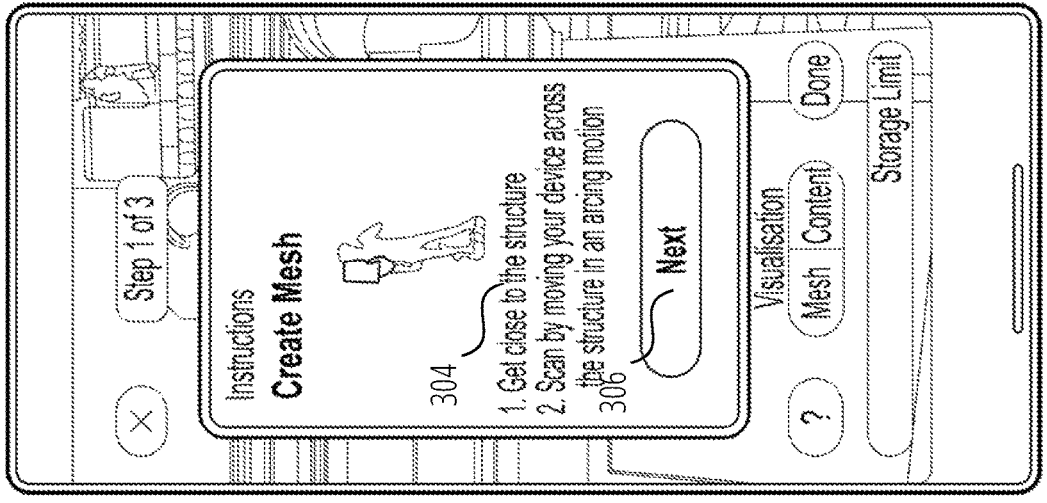
FIG. 3 illustrates a graphical user interface that is generated and displayed before starting a three-dimensional (3D) scanning process, according to some examples.

FIG. 2 illustrates a graphical user interface (GUI) 202 of a setting page, according to some examples. The GUI 202 may include display parameters such as the mode of scan, sizes of meshes in the 3D scanning process, and a number of perspectives in the area mapping process. For example, the mode of scan is either "combined" or "separated." In the combined mode, the data points captured in the 3D scanning process are reused in the area mapping process. In the separated mode, new data points are captured and used in the area mapping process. If a user wants a large mesh, the user can choose the separated mode; however, the separated mode may introduce errors in the placement of meshes. In some examples, the display parameters are remembered between lens sessions on the same device or stored in a cloud-based server and associated with the same user.

FIG. 3 illustrates a graphical user interface (GUI) 302 that is generated and displayed before starting a three-dimensional (3D) scanning process, according to some examples. The GUI 302 may include various visual representations, such as an instruction 304 about how to perform a 3D scanning process and a virtual button 306 to start the 3D scanning process. When a user presses the virtual button 306, the 3D scanning process begins and a GUI 4 in FIG. 4 is displayed.

Figure 5:
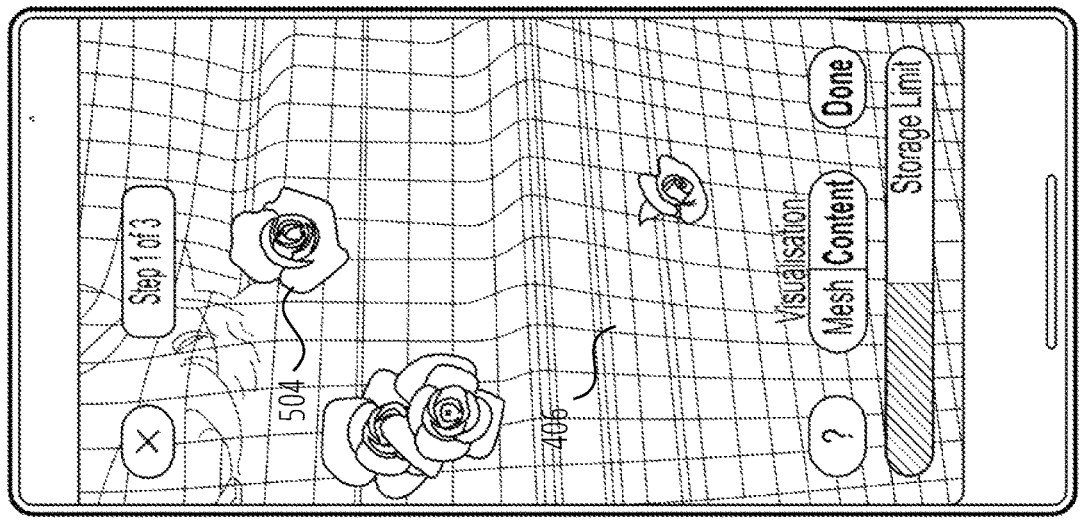
FIGS. 4-5 illustrate graphical user interfaces that are generated and displayed during a 3D scanning process, according to some examples.
Figure 4:
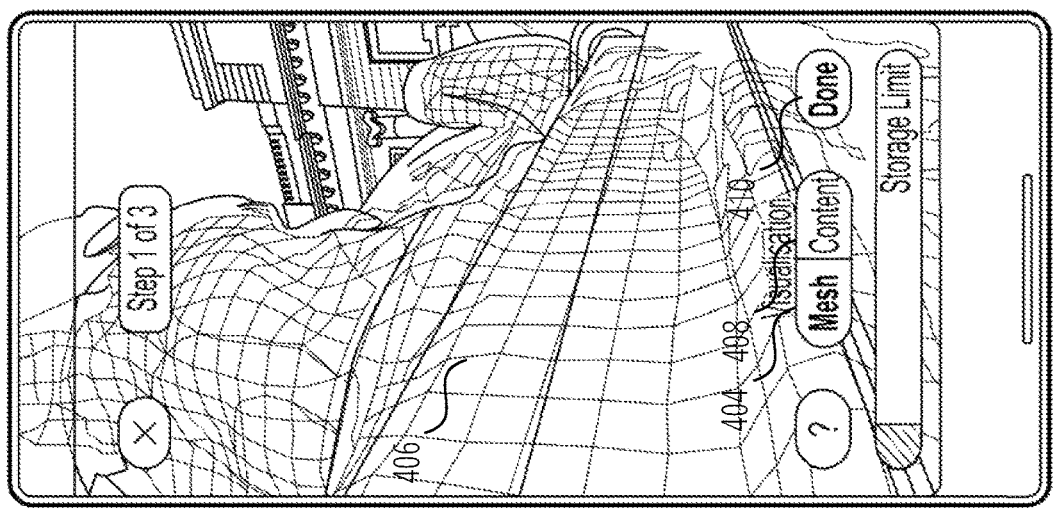

FIGS. 4-5 illustrate graphical user interfaces (GUI) 402 and 502 that are generated and displayed during a 3D scanning process, according to some examples. The GUI 402 may include a real-time camera view and 3D meshes 406 superimposed on a reference surface of a reference object (e.g., walls, windows, doors, cars) in the real-time view. The 3D meshes 406 are automatically generated when a user moves the camera around the reference object. The camera may include a LIDAR camera, a visible light camera, an infrared camera, etc. In some examples, the GUI 402 includes virtual buttons 404 and 408. When the user presses the virtual button 404, the 3D meshes 406 are displayed. When the user presses the virtual button 408, the GUI 502 is displayed, in which the meshes 406 are hidden or faded.

A user may interact with the real-time camera view in the GUI 402 or the GUI 502. For example, when the user touches the real-time camera view in the GUI 502, visual representation(s) such as flowers 508 are randomly spawned on the reference surface. In such a way, the user can check whether the generated meshes 406 are accurate.

In some examples, the GUI 402 (or the GUI 502) includes a finish button 410. A user may press the finish button 410, for example, when sufficient 3D meshes are deemed to have been generated to cover the reference surface. Alternatively, a machine (e.g., a mobile device which includes or is coupled to the camera) can automatically determine that sufficient 3D meshes have been generated (e.g., when a maximum storage limit is reached) and automatically terminate the 3D scanning process. When the 3D scanning process is terminated, a GUI 602 in FIG. 6 is displayed.

Figure 6:
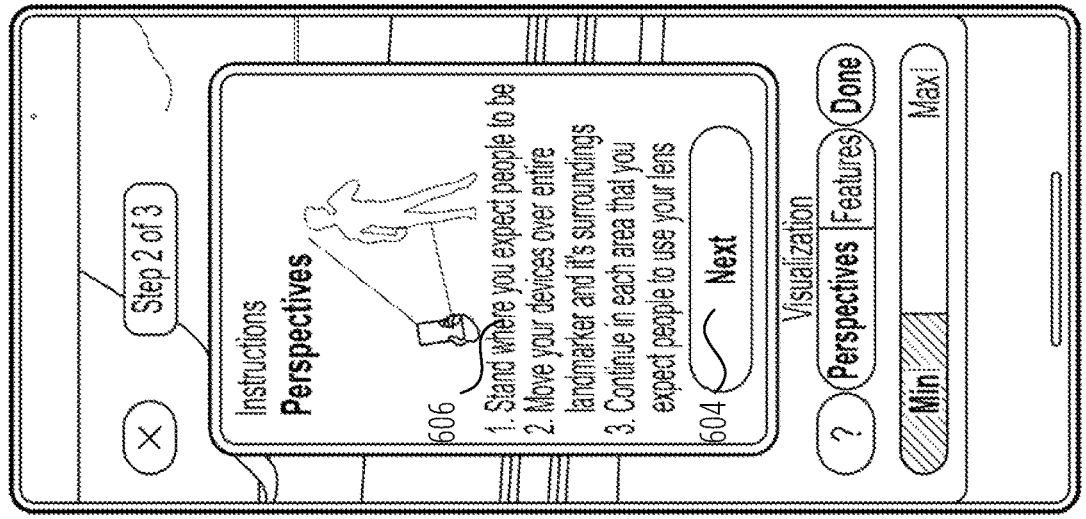
FIG. 6 illustrates a graphical user interface that is generated and displayed before starting an area mapping process, according to some examples.

FIG. 6 illustrates a graphical user interface (GUI) 602 generated and displayed before starting an area mapping process, according to some examples. The GUI 602 may include various visual representations such as an instruction 606 about how to perform an area mapping process and a virtual button 604 to start the area mapping process. When a user presses the virtual button 604, the area mapping process begins, and a GUI 702 in FIG. 7 is displayed.

Figure 8:
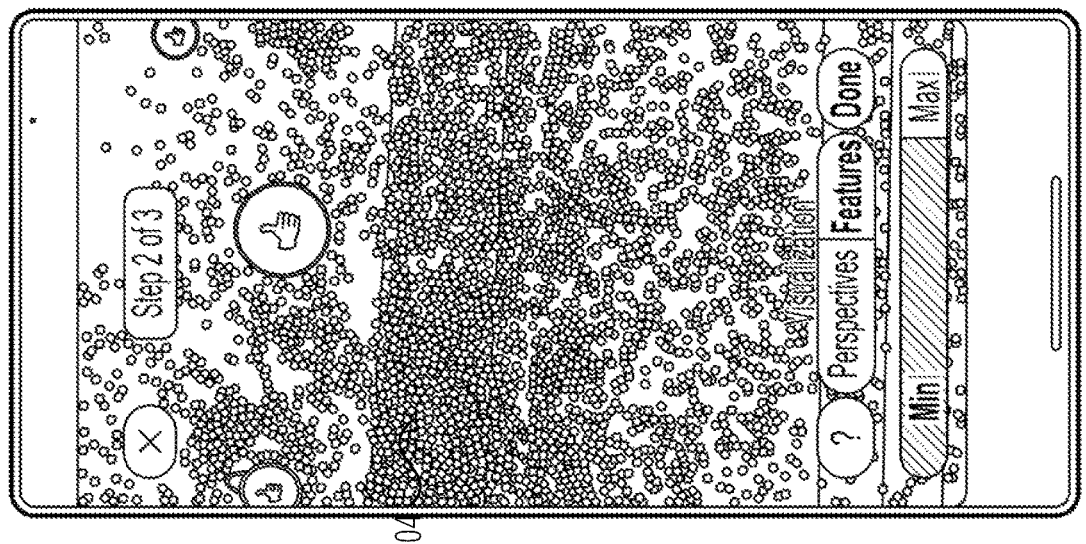
FIGS. 7-8 illustrate graphical user interfaces that are generated and displayed during an area mapping process, according to some examples.
Figure 7:
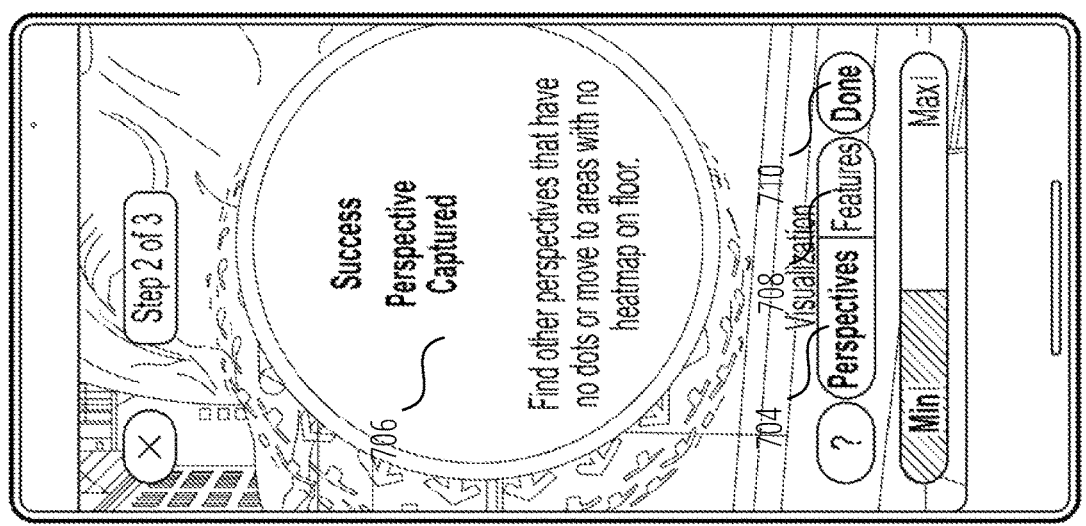

FIGS. 7-8 illustrate graphical user interfaces (GUI) 702 and 802 generated and displayed during an area mapping process, according to some examples. As shown in FIG. 7. The GUI 702 may present a real-time camera view. When a user moves around an object, structure or surface for which an AR landmarker/location is to be created, a perspective is captured every time the capture device, which includes a camera, moves more than a preset distance. The preset distance may be any applicable determined distance and shall not be limiting. For example, the preset distance is 1 cm, 2 cm, 5 cm, 10 cm, 20 cm, etc. The GUI 702 may include one or more representations 706 superimposed on the real-time view indicating that one or more perspectives are captured. The perspective is also called a keyframe in the present disclosure and a perspective corresponds to a position and an orientation (collectively referred to as a pose) of the camera. In some examples, the position and orientation of the camera are determined by a SLAM tracking model using computer vision (CV) technology. Additionally, or alternatively, the position and orientation of the camera are determined by a gyroscope installed on the camera or installed on a same device as which the camera is installed on.

The GUI 702 may include virtual buttons 704 and 708. When the user presses virtual button 704, the representation 706 corresponding to perspective is displayed. When the user presses virtual button 708, the GUI 802 is displayed, in which sparse points 804 (also called feature points or features) are displayed and the representation 706 is hidden. In the combined mode (set in GUI 202), the sparse points 804 are pre-generated in the 3D scanning process. In the separated mode (set in GUI 202), the sparse points 804 are newly generated in the area mapping process. In some examples, some sparse points 804 are pre-generated in the 3D scanning process and some sparse points 804 are newly generated in the area mapping process. A perspective is associated with a set of the sparse points 804.

The GUI 702 or the GUI 802 also includes a finish button 710. A user can press the finish button 710, for example when sufficient perspectives are deemed to have been generated. Alternatively, a machine determines that sufficient 3D meshes have been generated (e.g., when a maximum storage limit is reached) and automatically terminate the 3D scanning process. When the 3D scanning process is terminated, a GUI 902 in FIG. 9 is displayed.

Figure 9:
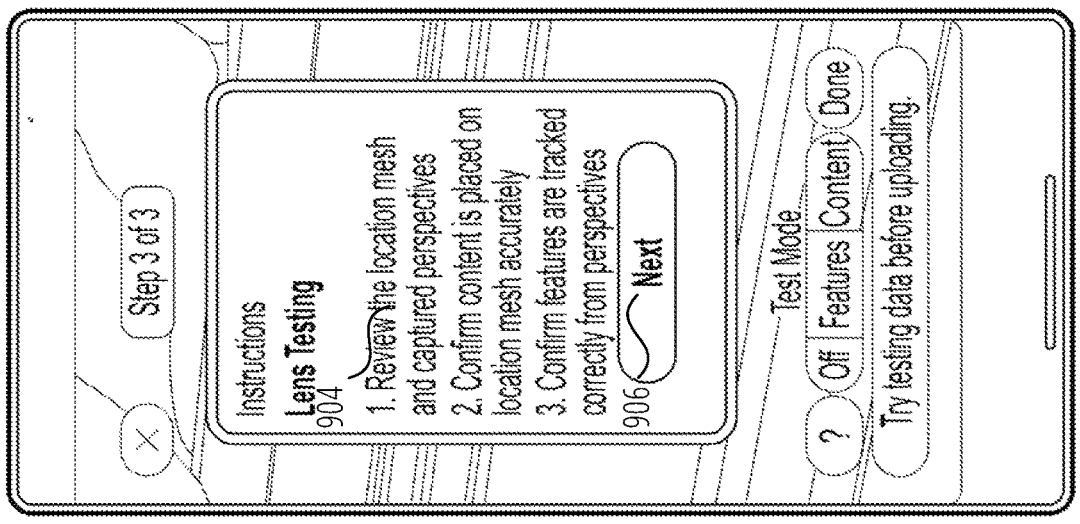
FIG. 9 illustrates a graphical user interface that is generated and displayed before starting a testing process, according to some examples.

FIG. 9 illustrates a graphical user interface (GUI) 902 generated and displayed before starting a testing process, according to some examples. The GUI 902 may include various visual representations such as an instruction 904 about how to perform a testing process and a virtual button 906 to start the testing process. When a user presses the virtual button 906, the testing process begins, and a GUI 1002 in FIG. 10 is displayed.

Figure 11:
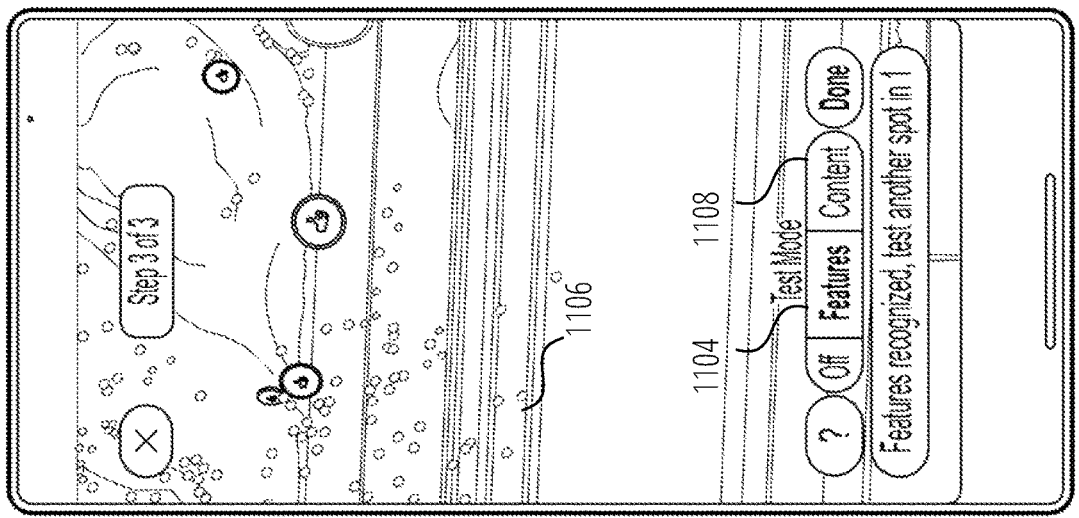
FIGS. 10-11 illustrate graphical user interfaces that are generated and displayed during a testing process, according to some examples.
Figure 10:
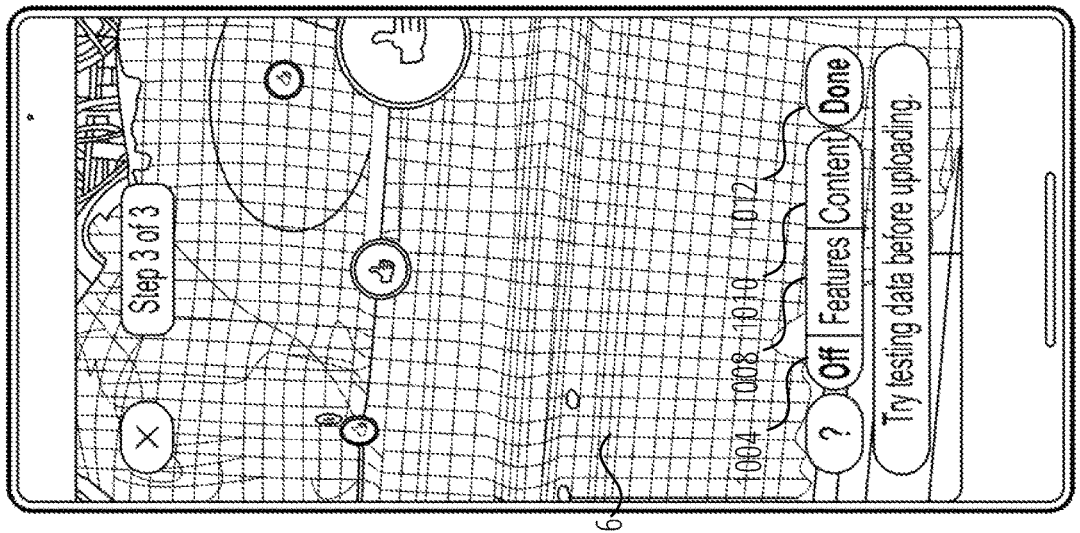

FIGS. 10-11 illustrate graphical user interfaces (GUI) 1002 and 1102 generated and displayed during a testing process, according to some examples. The GUI 1002 may include a real-time camera view and 3D meshes 1006 superimposed on the reference surface in the real-time view. The 3D meshes 1006 are generated according to the 3D meshes 406. Additionally, the GUI 1002 may include one or more representations (e.g., thumb-up in circles) representing captured perspectives. When a user moves around an object, structure or surface for which an AR landmarker/location is to be created, the GUI 1002 displays an indication (e.g., a text) about whether features on the AR landmarker/location are recognized at the current camera pose. Detailed descriptions regarding the determination of whether at a camera position can see the AR landmarker/location may be found in FIGS. 18 and 19 and descriptions thereof. The GUI 1002 may include virtual buttons 1004, 1008, and 1010. When the user presses the virtual button 1004, the meshes 1006 are displayed. When the user presses virtual button 1008, the GUI 1102 is displayed, in which the meshes 1006 are hidden and sparse points 1106 are displayed. When the user presses virtual button 1010, both the meshes 1006 and the sparse points 1106 are hidden. It should be noted that individual testing processes may be provided after the 3D scanning process and/or the area mapping process is completed.

In some examples, the GUI 1002 or the GUI 1102 includes a finish button 1012. A user may press the finish button 1012, for example, when they think that the meshes and perspectives are sufficient and accurate. When the testing process is terminated, the uploading process begins, and a GUI 1202 in FIG. 12 is displayed.

Figure 14:
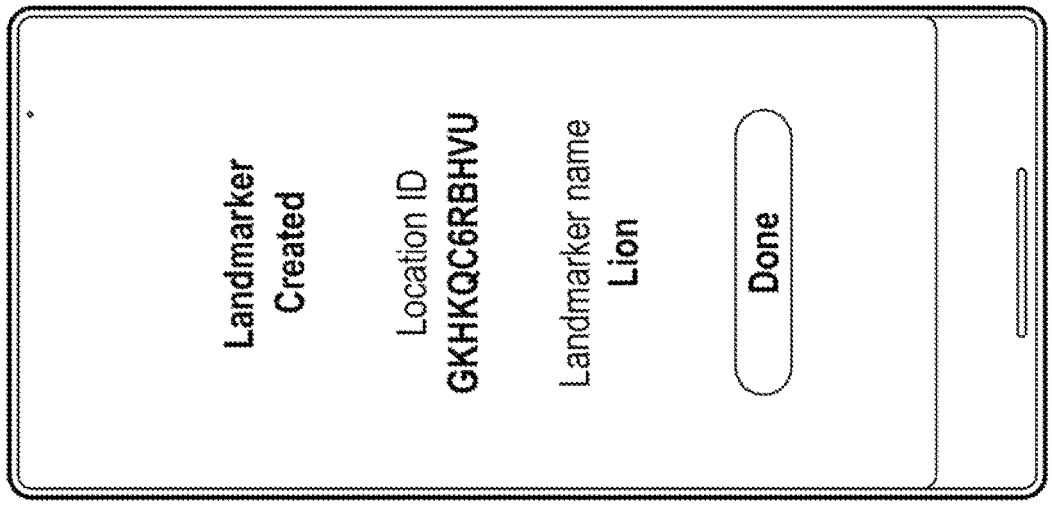
FIGS. 12-14 illustrates graphical user interfaces that are generated and displayed during an uploading process, according to some examples.
Figure 13:
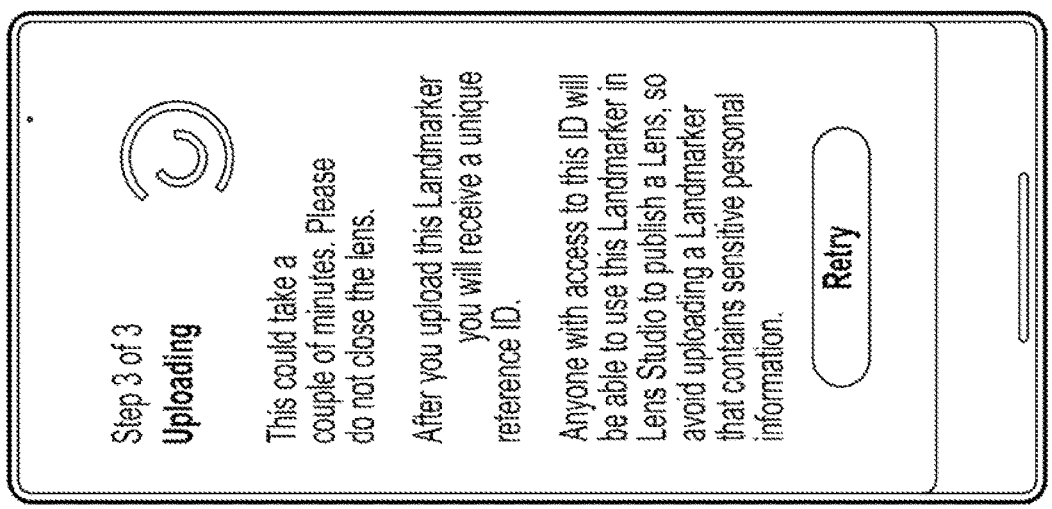
Figure 12:
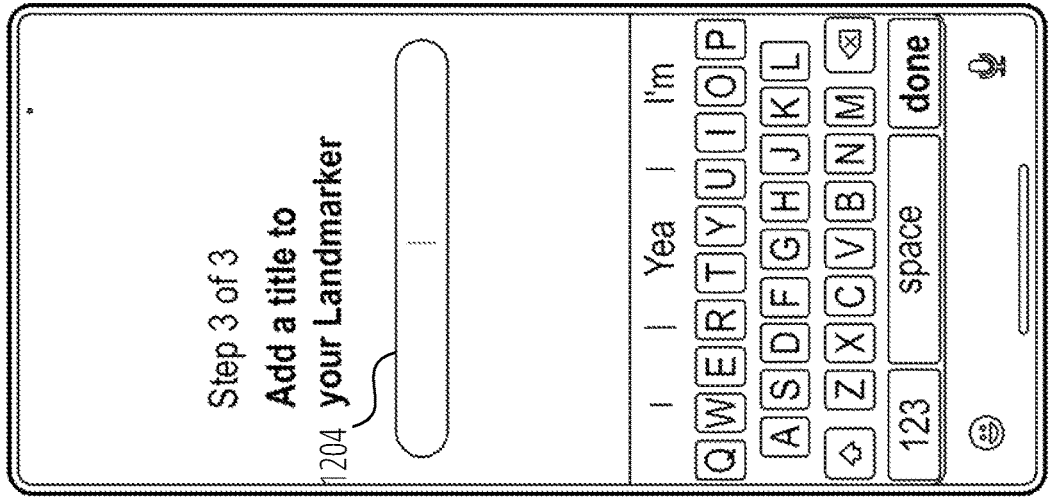

FIGS. 12-14 illustrate graphical user interfaces (GUI) 1202, 1204, and 1206 generated and displayed during an uploading (or publishing) process, according to some examples. The GUI 1202 may include an input box 1204 that allows a user to enter a title to the landmarker. After entering the title to the landmarker, the user can click on a virtual button (not shown in the figure) to upload the landmarker. For example, GUI 1302 is displayed while the AR landmarker/location is uploading. After the uploading finishes, the GUI 1402 is displayed. The GUI 1402 may include a name (or title) of the AR landmarker/location and a location ID.

Figure 15:
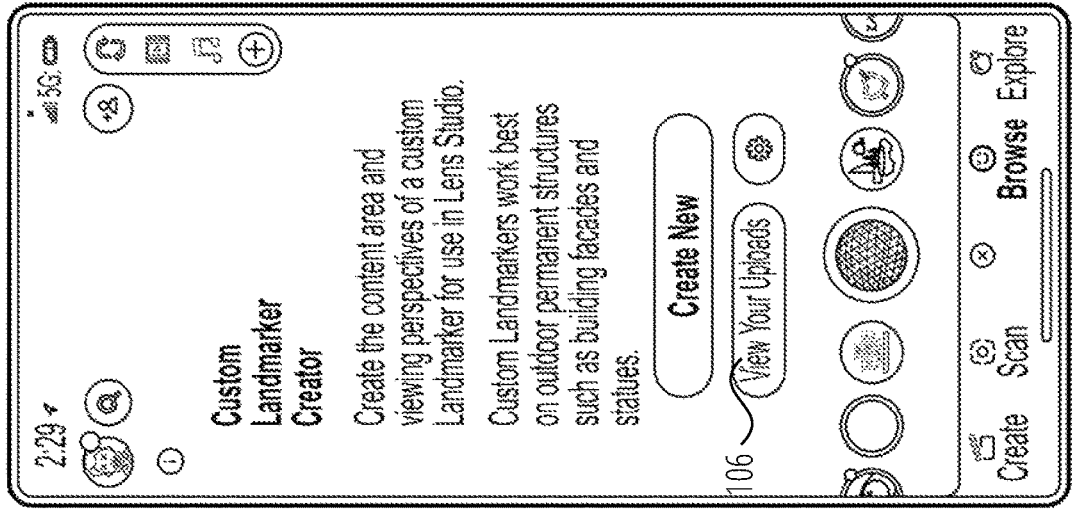
FIG. 15 illustrates a graphical user interface of a homepage, according to some examples.

FIG. 15 illustrates a graphical user interface 102 of a homepage, according to some examples. After the AR landmarker/location is uploaded successfully, the GUI 102, similar to that in FIG. 1 may be displayed. When the user presses the button 106 to view the uploaded landmarkers, a GUI 1602 in FIG. 16 is displayed.

FIG. 16 illustrates a graphical user interface 1602 of a list of uploaded AR landmarkers/locations, according to some examples. As shown in FIG. 16, the GUI 1602 includes a list of uploaded landmarkers. Each of the AR landmarkers/locations may have a unique location ID and a name. The user may select and view an AR landmarker/location by, for example, clicking on a "view" button corresponding to the landmarker. When the user presses the "view" button, a GUI 1702 shown in FIG. 17 is displayed.

Figure 17:
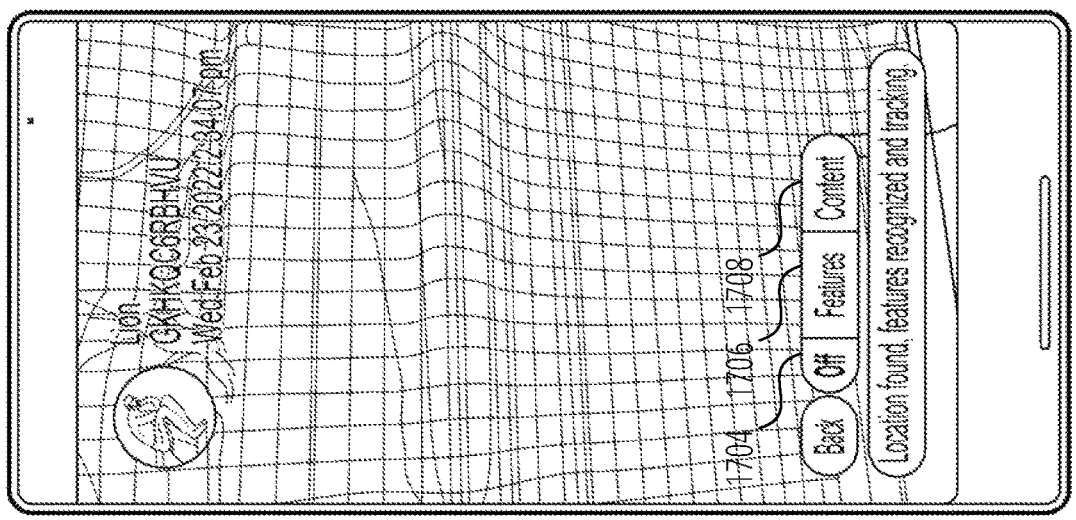
FIG. 17 illustrates a graphical user interface of a presentation of a selected AR landmarker/location, according to some examples.

FIG. 17 illustrates a graphical user interface 1702 of a presentation of a selected AR landmarker/location, according to some examples. The GUI 1702 may include a real-time view and three virtual buttons 1704, 1706, and 1708. When the user presses the virtual button 1704, meshes are generated on the reference surface in the real-time view. When the user presses the virtual button 1706, sparse points are generated on the reference surface in the real-time view. When the user presses the virtual button 1708, both the meshes and the sparse points are hidden.

Figure 18:
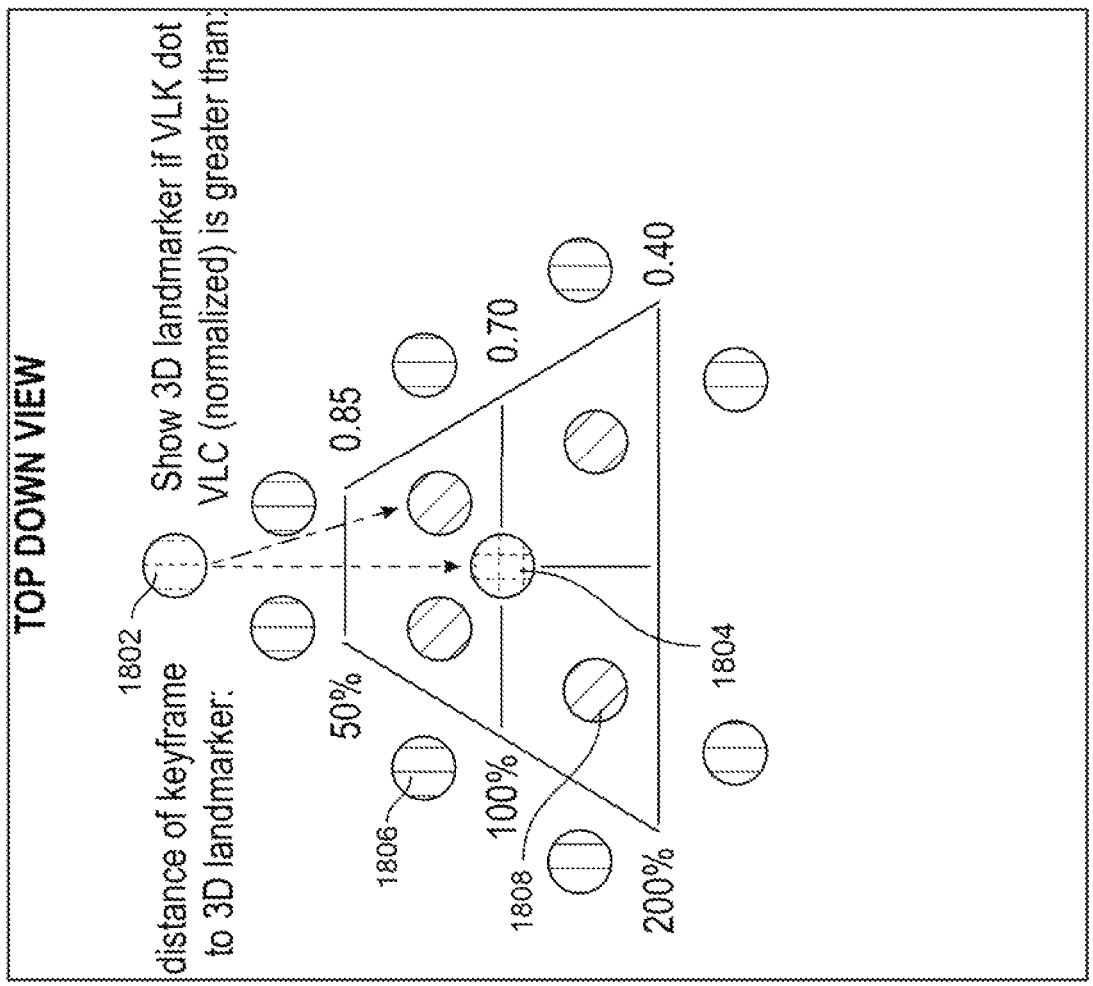
FIGS. 18-19 illustrate schematic diagrams of a spatial relationship between 3D AR landmarker/location and camera positions, according to some examples.
Figure 18:
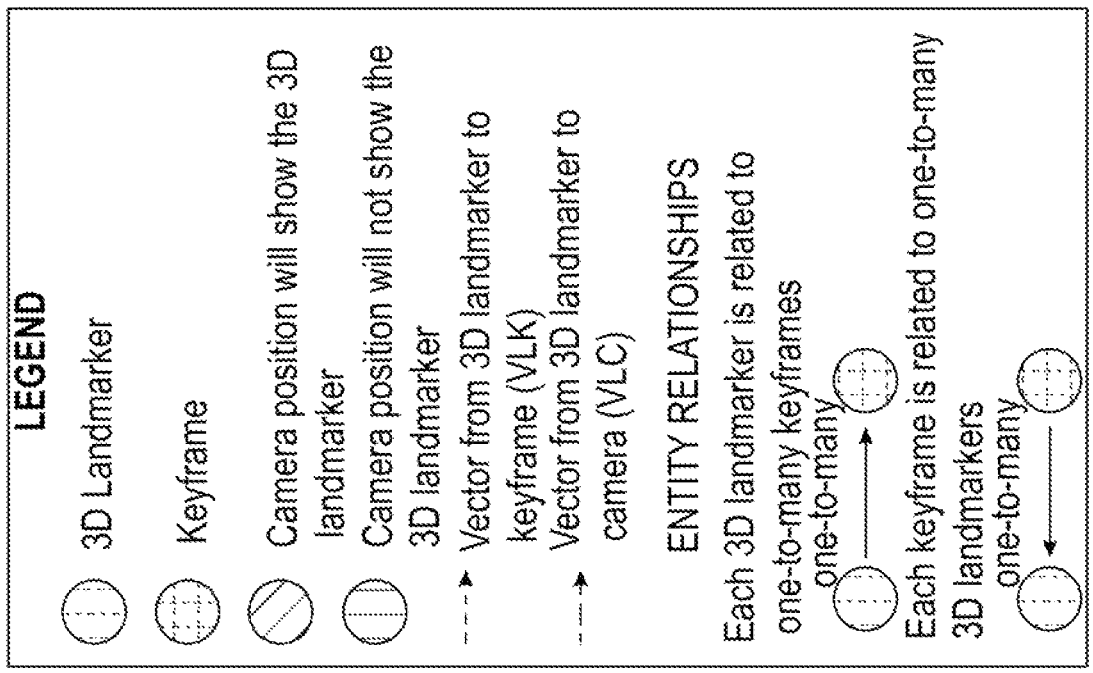
Figure 19:
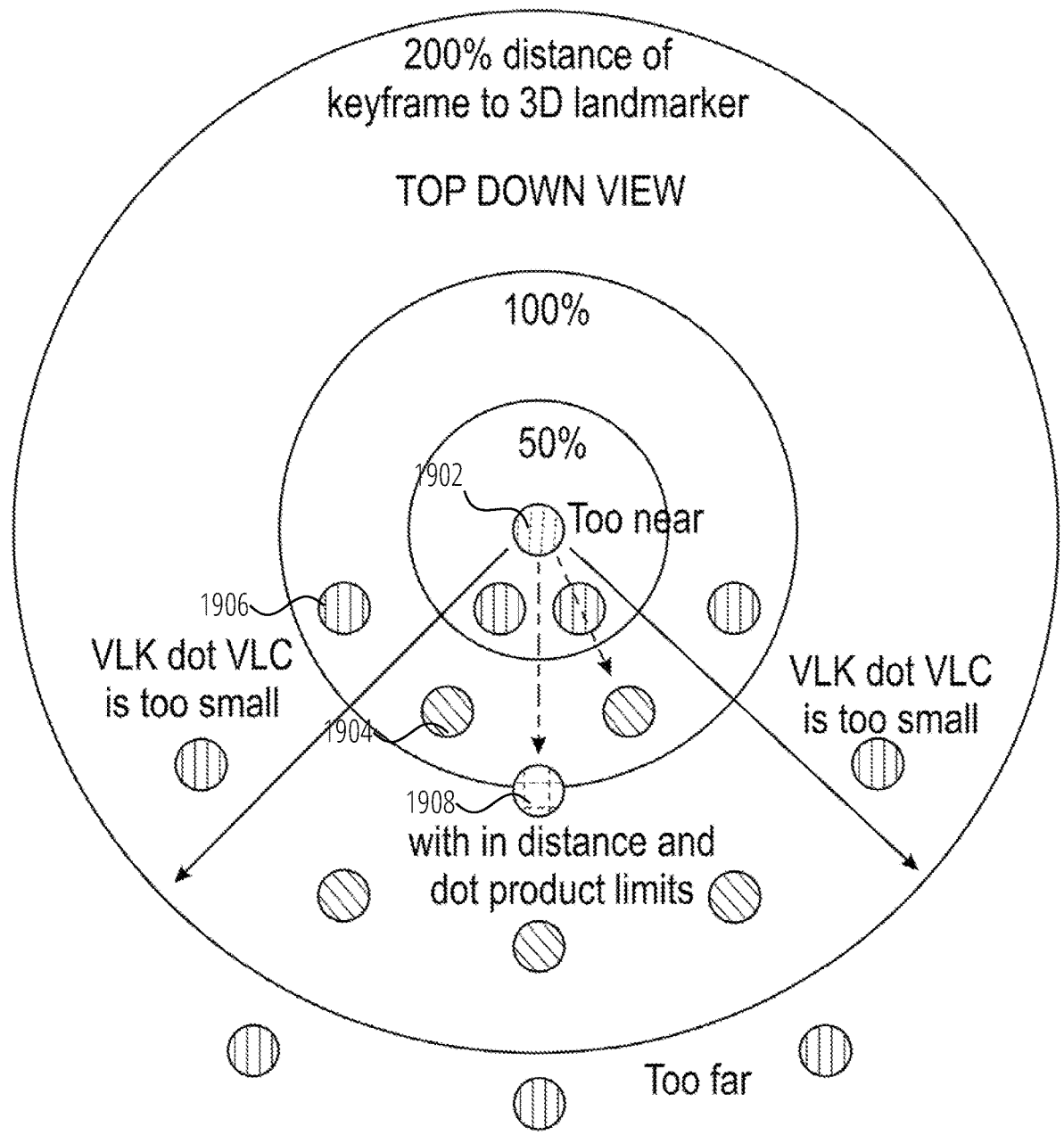

FIGS. 18-19 illustrate conceptual diagrams of a spatial relationship between 3D AR landmarker/location and camera positions, according to some examples. As shown in FIGS. 18 and 19, whether a 3D AR landmarker/location can be seen at a camera position (e.g., camera positions 1806, 1808) is determined based on a distance between the camera position and a landmarker target 1802 (e.g., an object, structure or surface to which the AR landmarker/location is to be applied) and a spatial relationship (e.g., an angle) between a vector connecting AR landmarker/location target 1802 and keyframe 1804 ("VLK") and a vector connecting AR landmarker/location target 1802 and the camera position ("VLC"). In some examples, the greater the distance between the camera position and the AR landmarker/location target 1802 is, the greater angle between VLK and VLC is allowed. Assuming the distance between AR landmarker/location target 1802 and the keyframe 1804 is normalized as 1, when the distance between the camera position and the AR landmarker/location target 1802 is around 0.5, VLK dot VLC should be more than 0.85 in order for the AR landmarker/location to be visible at the camera position. When the distance between the camera position and the AR landmarker/location target 1802 is around 1, VLK dot VLC should be more than 0.7 in order for the AR landmarker/location to be visible at the camera position. When the distance between the camera position and the AR landmarker/location target 1802 is around 2, VLK dot VLC should be more than 0.4 in order for the AR landmarker/location to be visible at the camera position. When the distance between the camera position and the AR landmarker/location target 1802 is less than 0.5 or more than 2, the AR landmarker/location is invisible regardless of the value of VLK dot VLC. It shall be noted that the values or thresholds provided are examples and shall not be limiting. Other applicable values or thresholds are also within the protection scope of the present disclosure.

Figure 20:
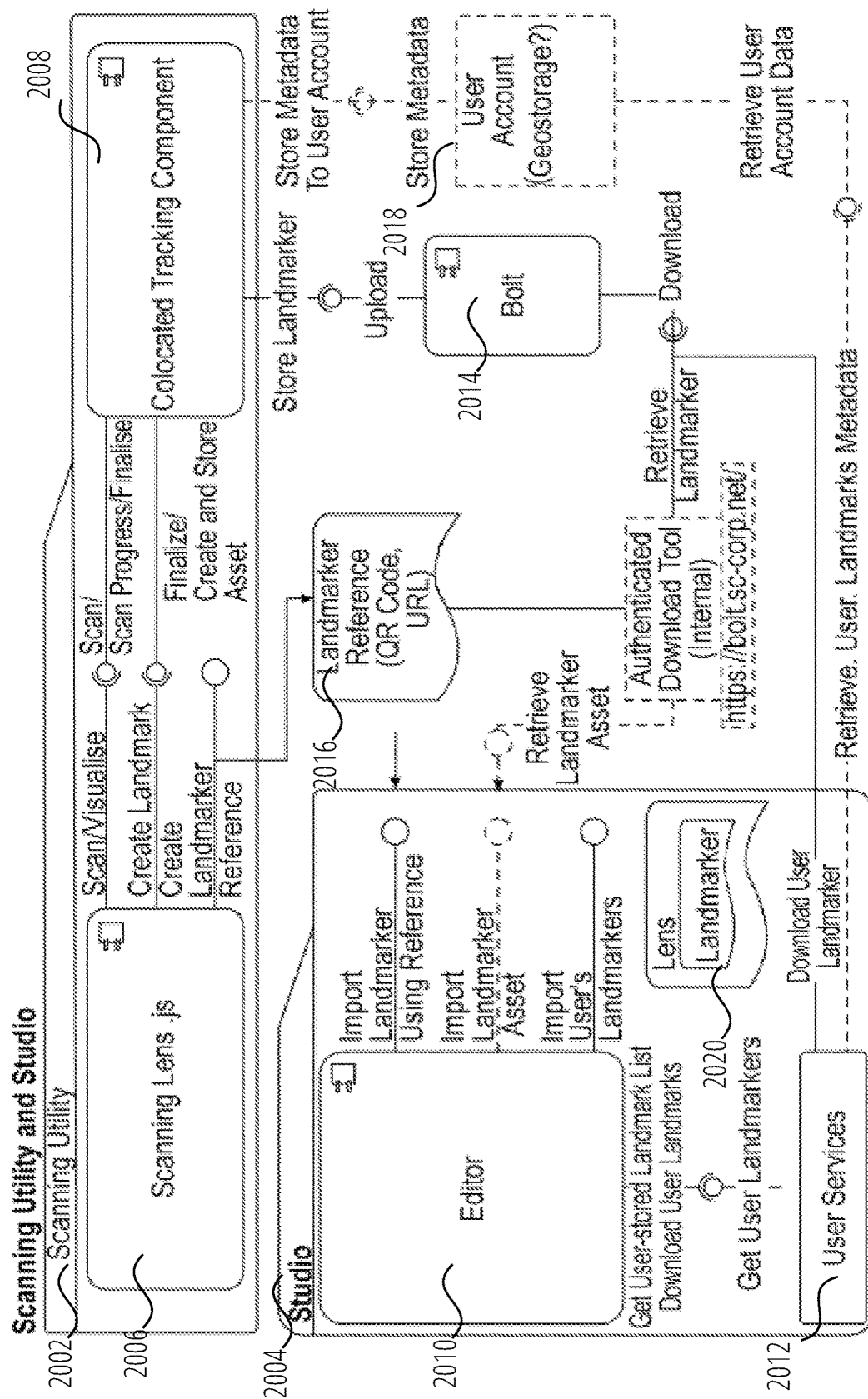
FIG. 20 is a block diagram showing the various component interactions for components of a scanning utility and components of an augmentation creation application according to some examples.

FIG. 20 is a block diagram showing the various component interactions for components of a scanning utility 2002 (e.g., which is included as an augmentation creation system 2914 within the application 2806), and components of an augmentation creation application (e.g., example referenced as a studio application 2004), according to some examples. As shown in FIG. 20, the scanning utility 2002 includes a scanning lens 2006 and a colocated tracking component 2008. The scanning utility 2002 may be a scanner application having a scanning function.

The studio application 2004 includes an editor 2010, a lens 2020, and user services 2012. In some examples, the scanning lens 2006 detects an AR landmarker/location reference 2016 (e.g., a QR code, an identifier, a URL). The editor 2010 imports an AR landmarker/location asset using the AR landmarker/location reference. Specifically, an AR landmarker/location asset may first be downloaded through an authenticated download tool 2014 (e.g., https://bolt.sc-corp.net/). The user services 2012 then download a user AR landmarker/location using the download tool 2014 and retrieve user landmarks metadata from a storage 2018 that stores metadata. The studio application 2004 may login on the storage 2018 to get customized metadata for a specific user account (e.g., an Online Account, or a Geostorage).

In some examples, the AR landmarker/location and the user AR landmarker/location metadata are generated by the colocated tracking component 2008. Specifically, a JavaScript API may be added to the colocated tracking component 2008 to allow the user to control the creation of landmark map. A user can incrementally build a collocated map by facilitating building of a map on top of an existing one. This is performed as follows: creating a session and scanning a collocated map; rejoining the session at a later time (ex. under different lighting conditions), and wait for the on Found event to fire, ensuring that any newly scanned data is aligned with the existing one; and call startBuilding again, which will augment the existing map with the newly captured data.

Figure 21:
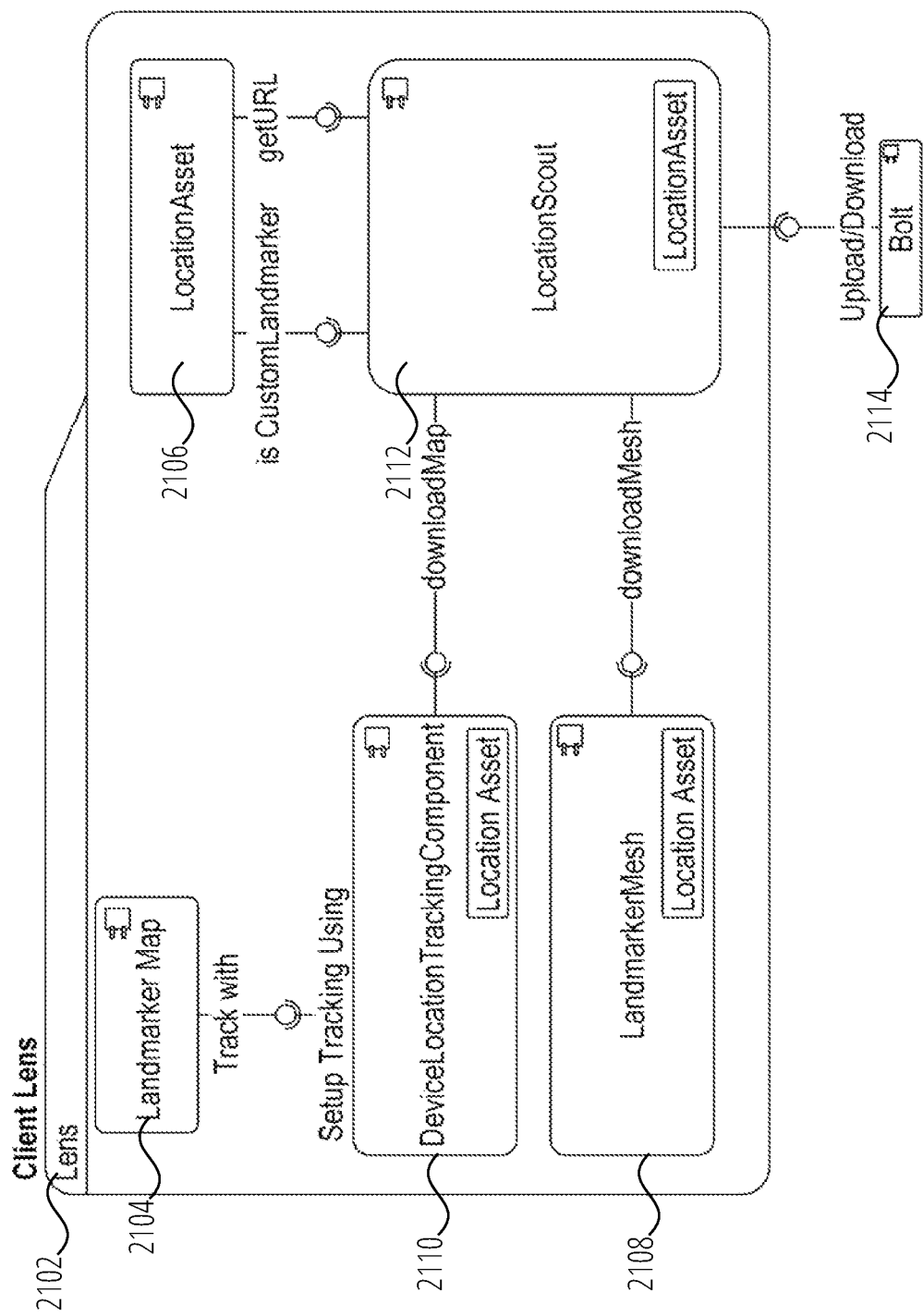
FIG. 21 is a block diagram showing various component interactions of an augmentation creation utility according to some examples.

FIG. 21 is a block diagram showing various component interactions of an augmentation creation utility (e.g., which is included an augmentation system 2906 within the application 2806 and is referenced as "lens"), according to some examples.

As shown in FIG. 21, the lens 2102 may include an AR landmarker/location map 2104, a location asset 2106, a device location tracking component 2110, an AR landmarker/location mesh 2108, and a location scout 2112. In some examples, the AR landmarker/location map 2104 is tracked by the device location tracking component 2110. When a URL is detected and a custom AR landmarker/location is found, the location scout 2112 receives data from location asset 2106. The device location tracking component 2110 downloads 3D sparse map from the location scout 2112. The AR landmarker/location mesh 2108 downloads mesh from the location scout 2112. The location scout 2112 uploads data to or download data from a bolt 2114.

Figure 22:
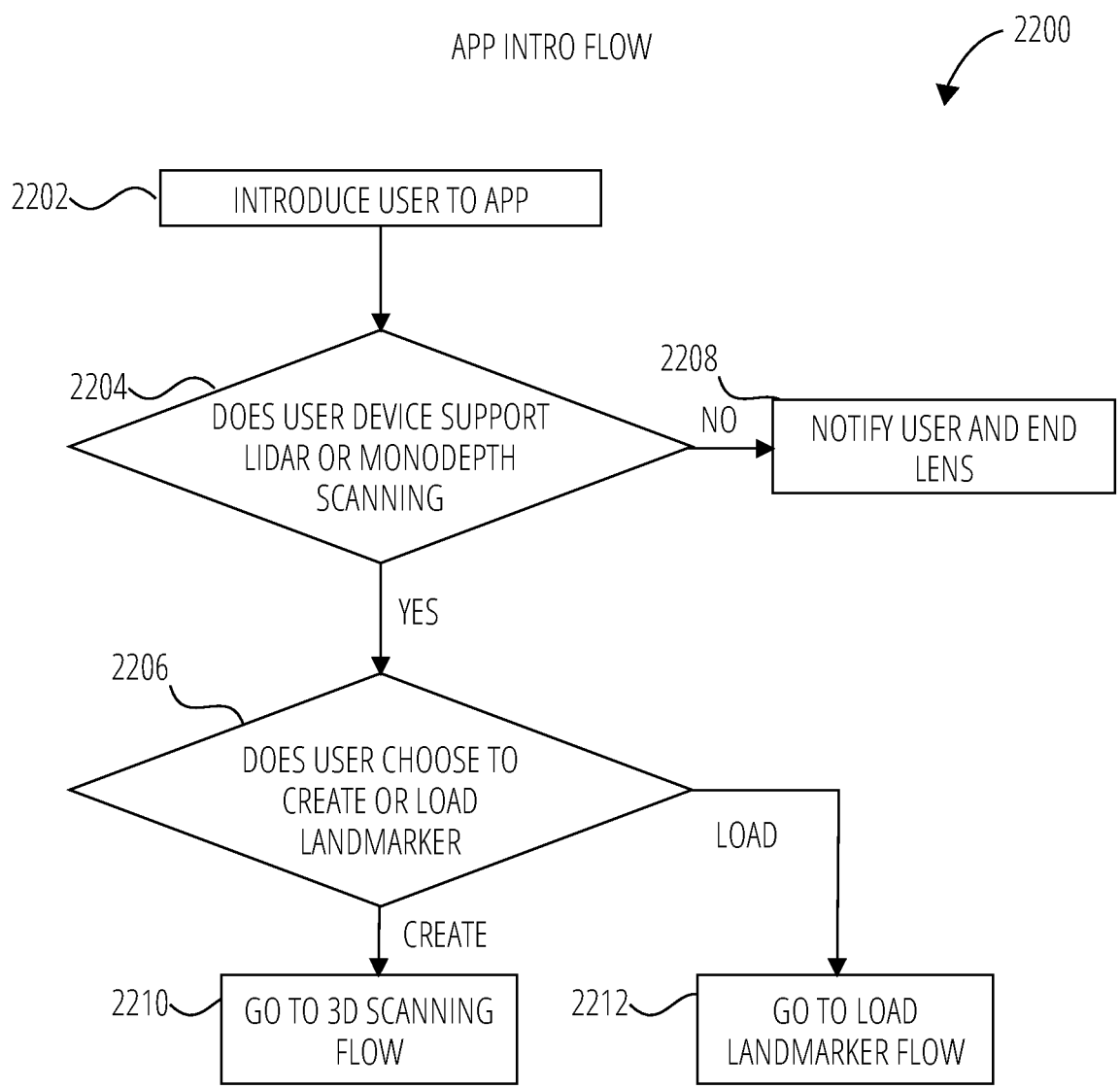
FIG. 22 is a flow chart illustrating a method that corresponds to an Application (APP) introduction flow, according to some examples.

FIG. 22 is a flow chart illustrating a method 2200 that corresponds to an Application (APP) introduction flow, according to some examples. The method 2200 is, in some examples, performed by a creation application, such as the scanning utility 2002 and the studio application 2004, described herein.

In operation 2202, the creation application introduces a user to functions and operations of the creation application. For examples, the creation application presents a graphical user interface that includes various visual representations such as multiple images or icons corresponding to the user and/or one or more icons corresponding to different functions of the APP, such as searching for a user, adding friends, sharing contents, changing a lens, etc. The visual representations may also include a virtual button for creating a new landmarker, a virtual button for viewing uploaded landmarkers, and/or a virtual button for setting parameters for creating the landmarker.

In operation 2204, the creation application determines whether the user device of the user supports LiDAR or whether it merely supports monodepth scanning. The creation application may directly query the operation system of the user device or execute a software-based or hardware-based program to determine whether the user device supports LiDAR. If the user device supports LiDAR, the method 2200 proceeds to operation 2206; otherwise, the method 2200 proceeds to operation 2208 where the creation application notifies the user and ends lens.

In operation 2206, the creation application determines whether the user chooses to create or load a landmarker. If the user chooses to create a landmarker, the method 2200 proceeds to operation 2210; if the user chooses to load a landmarker, the method 2200 proceeds to operation 2212.

In operation 2210, the method 2200 proceeds to method 2300 which corresponds to a 3D scanning flow. In operation 2212, the method 2200 proceeds to method 2600 which corresponds to a load AR landmarker/location flow.

Figure 23:
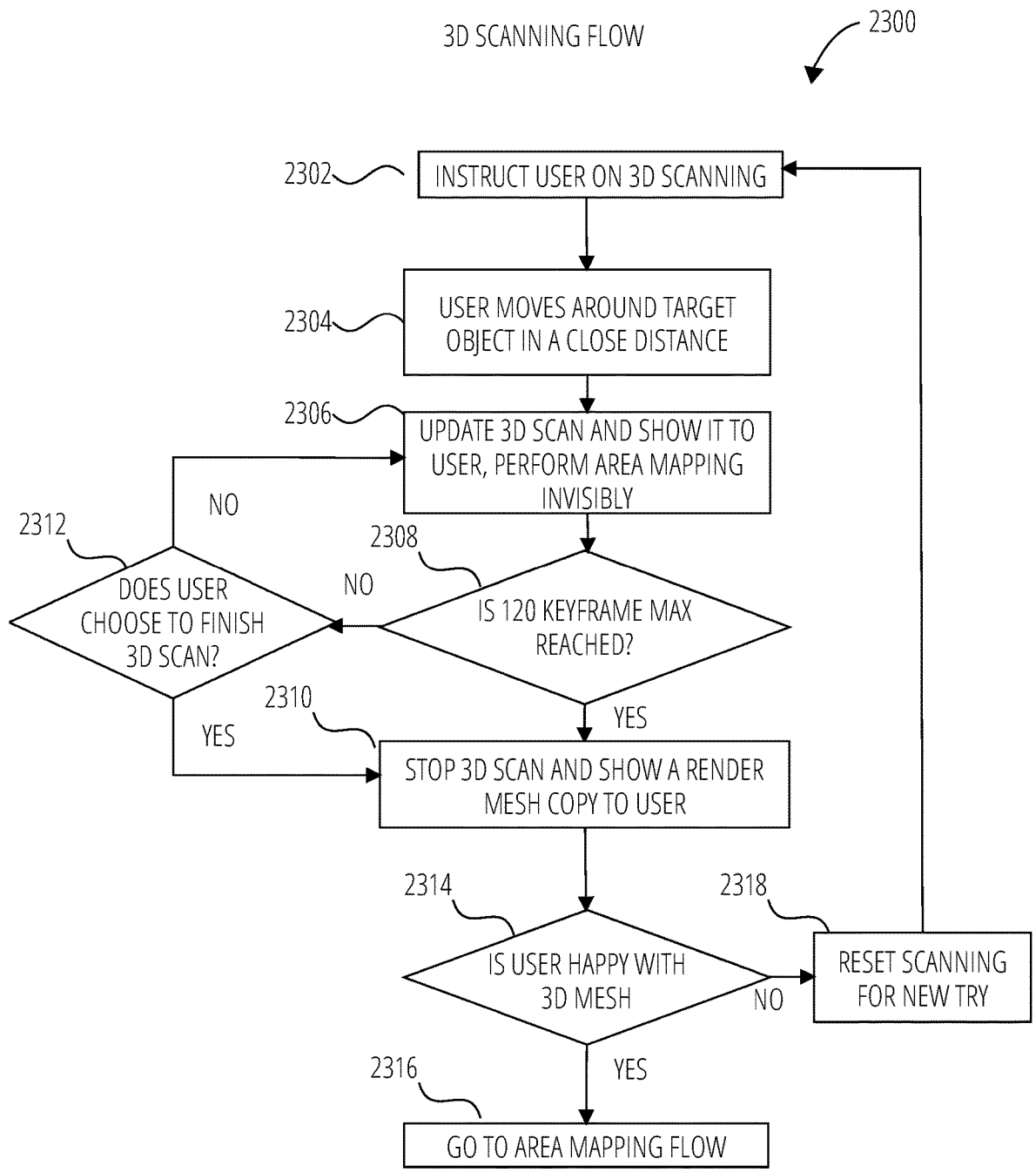
FIG. 23 is a flow chart illustrating a method that corresponds to a three-dimensional (3D) scanning flow, according to some examples.

FIG. 23 is a flow chart illustrating a method 2300 that corresponds to a three-dimensional (3D) scanning flow, according to some examples. The method 2300 is, in some examples, performed by a creation application, such as the scanning utility 2002 and the studio application 2004, described herein.

In operation 2302, the creation application instructs a user on the 3D scanning process. For example, the instructions include "Get close to the structure," "Scan by moving your device across the structure in an arc motion."

In operation 2304, the user moves around a target structure or object at a close distance. This operation is performed by the user and is illustrated as part of the method 2300 to facilitate an understanding of the 3D scanning flow.

In operation 2306, 3D scan is updated and shown to user by the creation application. If the user chooses a combined mode (e.g., set in GUI 202), a part of an area mapping flow is also done invisibly in operation 2306.

In operation 2308, the creation application determines whether a maximum keyframe threshold (e.g., 120 keyframes) is reached or transgressed. If the maximum keyframe threshold is reached or transgressed, the method 2300 proceeds to operation 2310; otherwise, the method 2300 proceeds to operation 2312.

In operation 2310, the 3D scanning process stops, and a rendered mesh copy is shown to the user. In operation 2312, the creation application determines whether the user chooses to finish the 3D scanning process, e.g., based on a manual selection on a GUI by the user. If the user chooses to finish the 3D scanning process, the method 2300 proceeds to operation 2310; otherwise, the method 2300 proceeds back to operation 2306.

In operation 2314, the creation application determines whether the user is satisfied with the 3D mesh copy, e.g., based on a manual selection on a GUI by the user. If the user is satisfied with the 3D mesh copy, the method 2300 proceeds to operation 2316; otherwise, the method 2300 proceeds to operation 2318.

In operation 2316, the method 2300 proceeds to method 2400 which corresponds to an area mapping flow. In operation 2318, the creation application resets the 3D scanning result and proceeds back to operation 2302 and starts a new 3D scanning flow.

Figure 24:
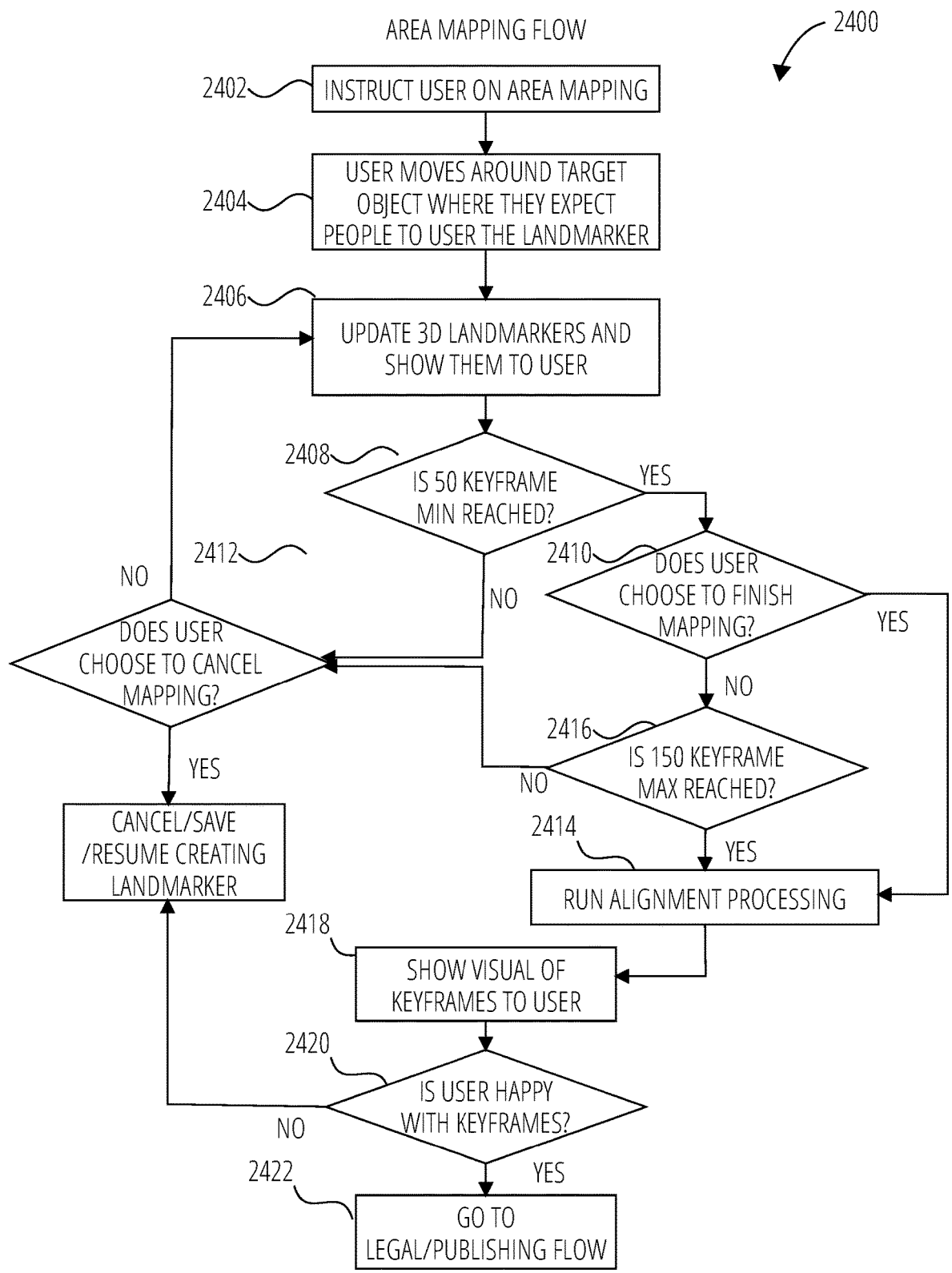
FIG. 24 is a flow chart illustrating a method that corresponds to an area mapping flow, according to some examples.

FIG. 24 is a flow chart illustrating a method 2400 that corresponds to an area mapping flow, according to some examples. The method 2400 is, in some examples, performed by a creation application, such as the scanning utility 2002 and the studio application 2004, described herein.

In operation 2402, the creation application instructs a user on the area mapping process. For example, the instructions include "Stand where you expect people to be," "Move your devices over entire landmarker target and its surroundings," and "Continue in each area that you expect people to user your lens."

In operation 2404, the user moves around the target structure or object where they expect people to use an AR landmarker/location lens. This operation is not performed by the creation application but by the user and is put in the method 2400 to ease the understanding of the area mapping flow.

In operation 2406, the 3D AR landmarker/location is updated and shown to the user. In operation 2408, the creation application determines whether a minimum keyframe threshold (e.g., 50 keyframes) is reached. If the minimum key frame threshold is reached, the method 2400 proceeds to operation 2410; otherwise, the method 2400 proceeds to operation 2412.

In operation 2410, the creation application determines whether the user chooses to finish the area mapping process, e.g., based on a manual selection on a GUI by the user. If the user chooses to finish the area mapping process, the method 2400 proceeds to operation 2414; otherwise, the method 2400 proceeds to operation 2416.

In operation 2412, the creation application determines whether the user chooses to cancel mapping, e.g., based on a manual selection on a GUI by the user. If the user chooses to cancel mapping, the method 2400 may terminate or may proceed back to operation 2202, to operation 2302 or to operation 2402.

In operation 2414, the creation application runs an alignment process. In operation 2416, the creation application determines whether a maximum keyframe threshold (e.g., 150 keyframes) is reached. If the maximum keyframe threshold is reached, the method 2400 proceeds to operation 2414; otherwise, the method 2400 proceeds to operation 2412.

In operation 2418, visual representation of keyframes is shown to the user. In operation 2420, determine whether the user is satisfied with keyframes, e.g., based on a manual selection on a GUI by the user. If the user is satisfied with keyframes, the method 2400 proceeds to operation 2422; otherwise, the method 2400 terminates or proceeds back to operation 2202, to operation 2302, or to operation 2402. In operation 2422, the method 2400 proceeds to method 2500 which corresponds to a legal/publishing flow.

Figure 25:
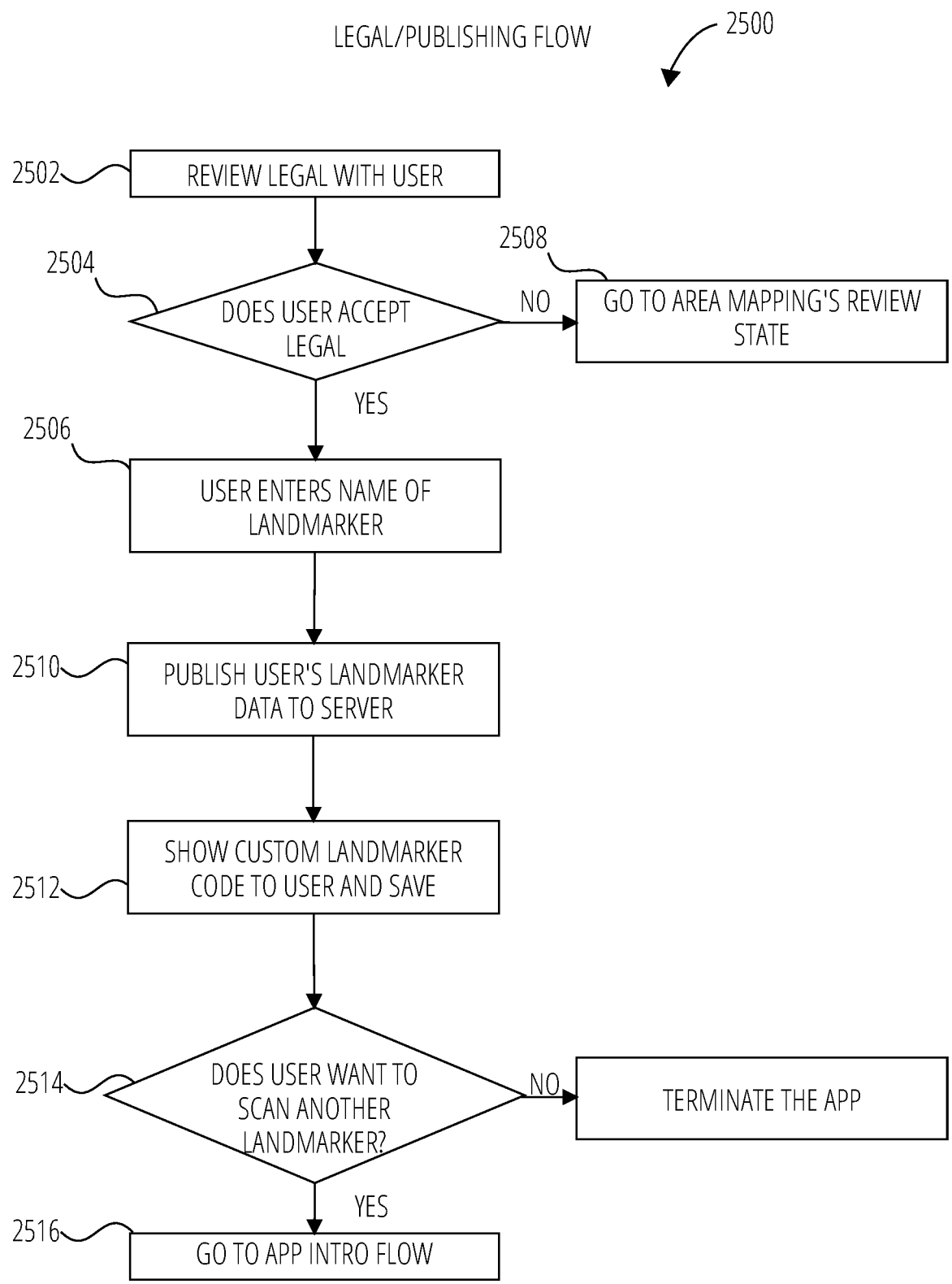
FIG. 25 is a flow chart illustrating a method that corresponds to an area mapping flow, according to some examples.

FIG. 25 is a flow chart illustrating a method 2500 that corresponds to an area mapping flow, according to some examples. The method 2500 is, in some examples, performed by a creation application, such as the scanning utility 2002 and the studio application 2004, described herein.

In operation 2502, the creation application reviews legal terms with a user. In operation 2504, the creation application determines whether the user accepts the legal terms, e.g., based on a manual selection on a GUI by the user. If the user accepts the legal terms, the method 2500 proceeds to operation 2506; otherwise, the method 2500 proceeds to operation 2508 where method 2500 proceeds to operation 2418.

In operation 2506, the user enters a name of the landmarker. In operation 2510, the creation application publishes the user's AR landmarker/location data to a server.

In operation 2512, the creation application shows the custom AR landmarker/location code to the user and the creation application saves the landmarker. In operation 2514, the creation application determines whether the user wants to scan another landmarker. If the user wants to scan another landmarker, the method 2500 proceeds to operation 2516 and proceeds back to method 2200 which corresponds to the APP introduction flow; otherwise, the creation application is terminated.

Figure 26:
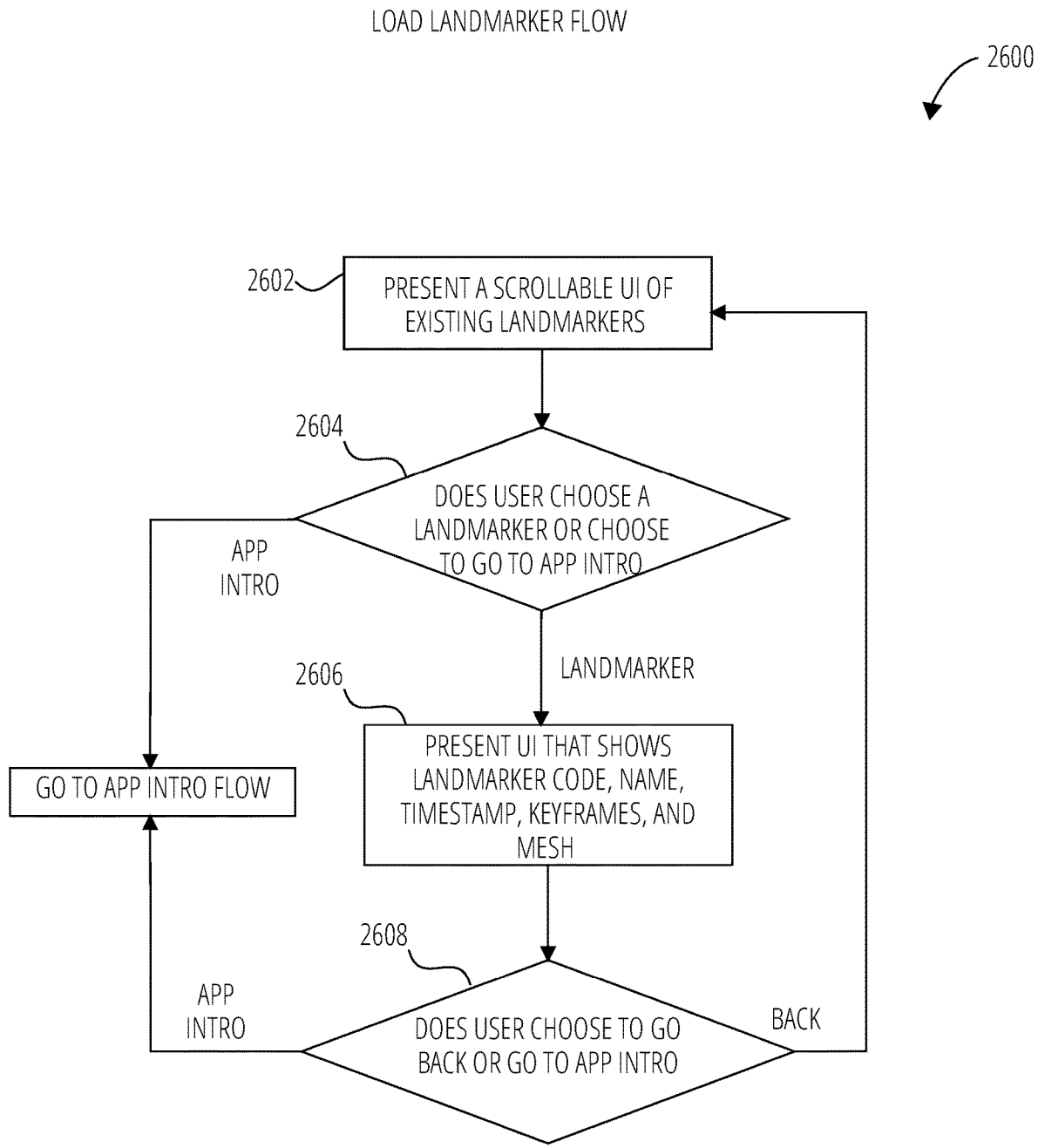
FIG. 26 is a flow chart illustrating a method that corresponds to an area mapping flow, according to some examples.

FIG. 26 is a flow chart illustrating a method 2600 that corresponds to an area mapping flow, according to some examples. The method 2600 is, in some examples, performed by a creation application, such as the scanning utility 2002 and the studio application 2004, described herein.

In operation 2602, the creation application provides a scrollable UI of existing AR landmarkers/locations to a user. In operation 2604, the creation application determines whether the user selected or chooses a landmarker, or chooses to go back to APP introduction. If the user chooses a landmarker, the method 2600 proceeds to operation 2606; otherwise, the method 2600 proceeds to the method 2200 which corresponds to an APP intro flow. In operation 2606, the creation application provides a UI that shows AR landmarker/location code, name timestamp, keyframes, mesh, or the like, or any combination thereof. In operation 2608, the creation application determines whether the user chooses to go back or go to APP introduction. If the user chooses to go back, the method 2600 proceeds back to operation 2602; otherwise, the method 2600 proceeds to method 2200 which corresponds to an APP intro flow.

Figure 27:
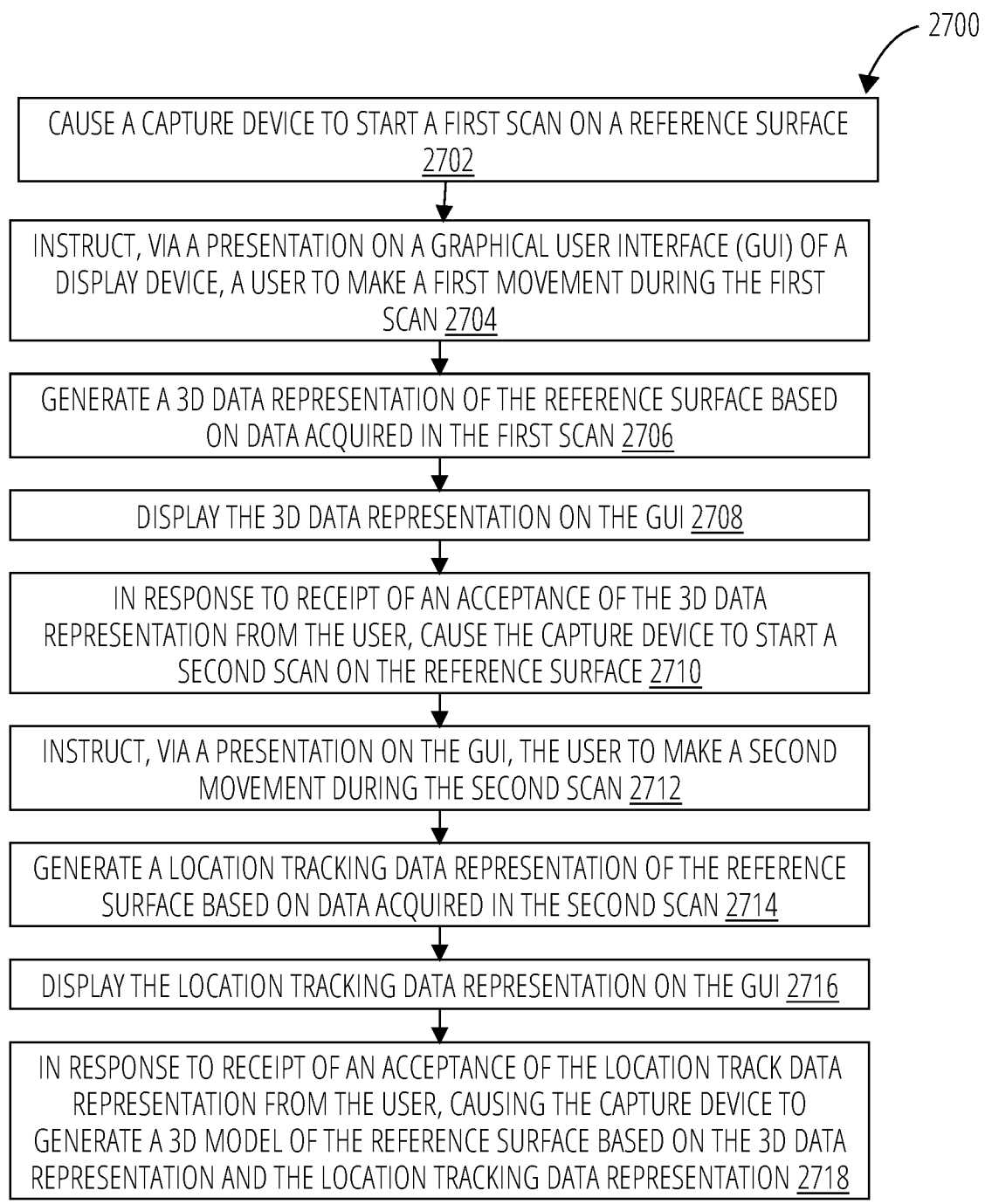
FIG. 27 is a flow chart illustrating a method to create a custom AR landmarker/location of a reference surface, according to some examples.

FIG. 27 is a flow chart illustrating a method 2700 to create a custom AR landmarker/location of a reference surface, according to some examples. The method 2600 is, in some examples, performed by a creation application, such as the scanning utility 2002 and the studio application 2004, described herein.

In operation 2702, the creation application causes a capture device to start a first scan on the reference surface. In some examples, the creation application enables, via an GUI (e.g., GUI 202), a user to select multiple display parameters of the first scan (and/or a second scan) before causing the capture device to start the first scan.

In operation 2704, the creation application instructs, via a presentation on a graphical user interface (GUI) of a display device, the user to make a first movement during the first scan. For example, the creation application instructs, via the GUI, the user to move around the reference surface. Then, the creation application measures a distance from the capture device to the reference surface. Based on a determination that the distance from the capture device to the reference surface is not within a distance range, the creation application instructs, via the GUI, the user to move to another location.

In operation 2706, the creation application generates a 3D data representation of the reference surface based on data acquired in the first scan.

In operation 2708, the creation application displays the 3D data representation on the GUI. The 3D data representation of the reference surface may be updated and displayed during the first scan until a first terminate condition is met. The first terminate condition may include: a number of frames captured during the first scan meets or exceeds a first frame threshold; and/or a request to finish the first scan is received from the user.

The 3D data representation may be displayed based on the multiple display parameters of the first scan. In some examples, in response to receipt of an operation on the GUI of the display device from the user, the creation application superimposes a graphical effect on the displayed 3D data representation.

In operation 2710, in response to receipt of an acceptance of the 3D data representation from the user, the creation application causes the capture device to start a second scan on the reference surface. Otherwise, in response to receipt of a rejection of the 3D data representation from the user, the creation application deletes or discards the data acquired in the first scan and causes the capture device to restart the first scan.

In operation 2712, the creation application instructs, via a presentation on the GUI, the user to make a second movement during the second scan. For example, the creation application determines a keyframe corresponding to the reference surface based on the 3D data representation acquired in the first scan. Then the creation application determines a location of the user based on the data acquired in the second scan. The creation application compares the keyframe with the location of the user to determine that the location of the user meets a predetermined condition. In response to determining that the location of the user meets the predetermined condition, the creation application generates the location tracking data representation based on the data acquired in the second scan and instructing, via the GUI, the user to move to another location.

In some examples, the comparing the keyframe with the location of the user to determine whether the location of the user meet the predetermined condition includes calculating an index based on a vector connecting the reference surface to the keyframe and a vector connecting the reference surface to the location of the user; and comparing the index with an index threshold to determine that the location of the user meets the predetermined condition.

In operation 2714, the creation application generates a location tracking data representation of the reference surface based on data acquired in the second scan.

In operation 2716, the creation application displays the location tracking data representation on the GUI. In some examples, the location tracking data representation of the reference surface is update and displayed during the second scan until a second terminate condition is met. The second terminate condition may include: a number of frames captured during the second scan meets or exceeds a second frame threshold; and/or a request to finish the second scan is received from the user. The location tracking data representation may be displayed based on the multiple display parameters of the second scan.

In operation 2718, in response to receipt of an acceptance of the location tracks data representation from the user, the creation application causes the capture device to generate a 3D model of the reference surface based on the 3D data representation and the location tracking data representation. In response to receipt of a rejection of the location tracking data representation of the reference surface, the creation application may delete or discard the data acquired in the second scan and causes the capture device to restart the second scan. In response to receipt of a request to cancel during the second scan, the creation application may delete the data acquired in the first scan and the data acquired in the second scan and cause the capture device to restart the first scan.

In some examples, the method 2700 further includes uploading the 3D model of the reference surface to a server system; associating an identifier with the 3D model of the reference surface at the server system; and making the 3D model of the reference surface available to a further user of the server system using the identifier. After the further user downloads the 3D model using the identifier, the creation application executed on the device of the other users may instruct, via a GUI of a display device of the further user, to make a movement until the further user is at a location similar to a location of the user. The creation application then augments the 3D model to create augmented image data superimposed on the reference surface as an augmented reality superimposition.

Networked Computing Environment

Figure 28:
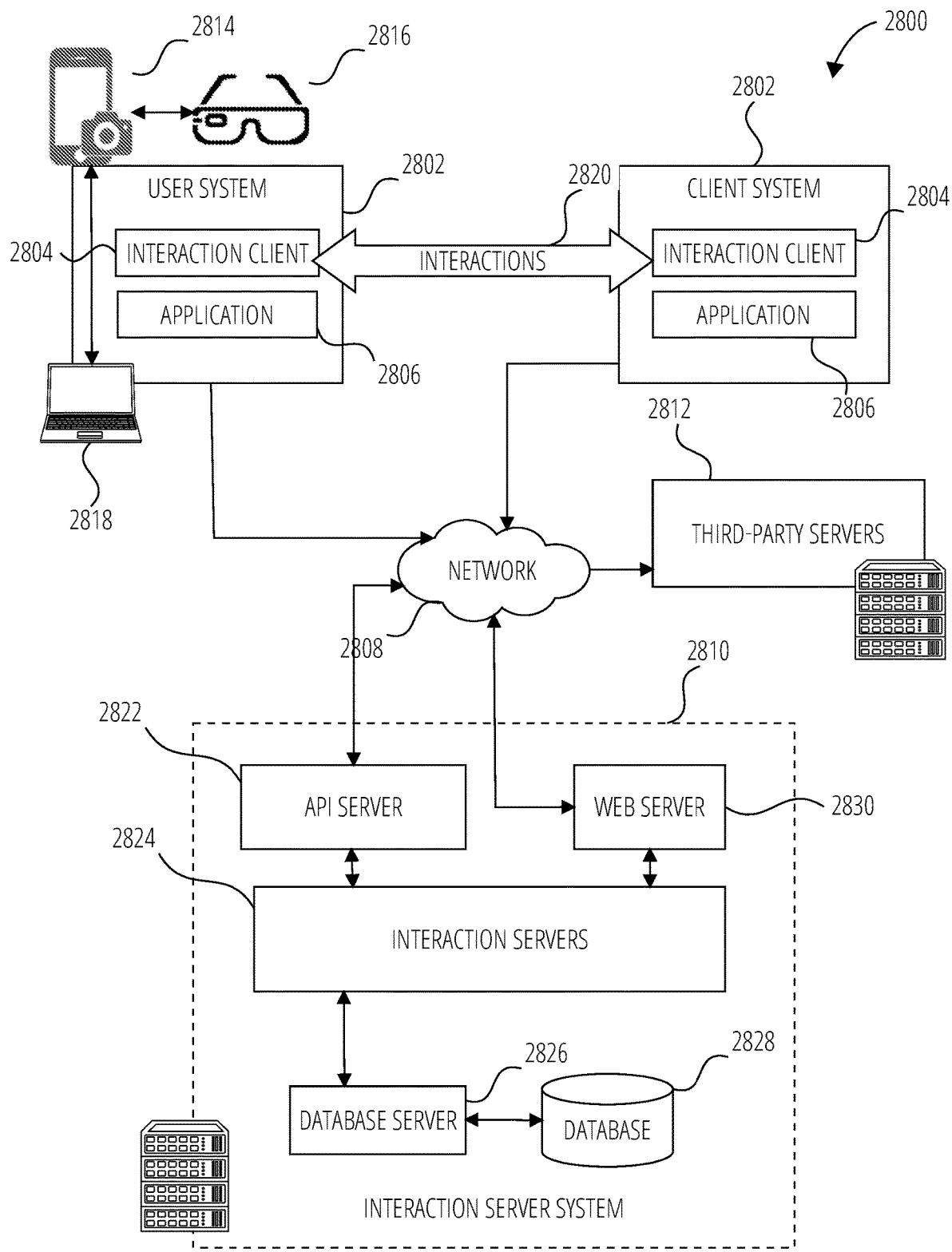
FIG. 28 is a diagrammatic representation of a networked environment in which the present disclosure may be deployed, according to some examples.

FIG. 28 is a block diagram showing an example interaction system 2800 for facilitating interactions (e.g., exchanging text messages, conducting text audio and video calls, or playing games) over a network. The interaction system 2800 includes multiple client systems 2802, each of which hosts multiple applications, including an interaction client 2804 and other applications 2806. Each interaction client 2804 is communicatively coupled, via one or more communication networks including a network 2808 (e.g., the Internet), to other instances of the interaction client 2804 (e.g., hosted on respective other user systems 102), an interaction server system 2810 and third-party servers 2812). An interaction client 2804 can also communicate with locally hosted applications 2806 using Applications Program Interfaces (APIs).

Each user system 2802 may include multiple user devices, such as a mobile device 2814, head-wearable apparatus 2816, and a computer client device 2818 that are communicatively connected to exchange data and messages.

An interaction client 2804 interacts with other interaction clients 2804 and with the interaction server system 2810 via the network 2808. The data exchanged between the interaction clients 2804 (e.g., interactions 2820) and between the interaction clients 2804 and the interaction server system 2810 includes functions (e.g., commands to invoke functions) and payload data (e.g., text, audio, video, or other multimedia data).

The interaction server system 2810 provides server-side functionality via the network 2808 to the interaction clients 2804. While certain functions of the interaction system 2800 are described herein as being performed by either an interaction client 2804 or by the interaction server system 2810, the location of certain functionality either within the interaction client 2804 or the interaction server system 2810 may be a design choice. For example, it may be technically preferable to initially deploy particular technology and functionality within the interaction server system 2810 but to later migrate this technology and functionality to the interaction client 2804 where a user system 2802 has sufficient processing capacity.

The interaction server system 2810 supports various services and operations that are provided to the interaction clients 2804. Such operations include transmitting data to, receiving data from, and processing data generated by the interaction clients 2804. This data may include message content, client device information, geolocation information, media augmentation and overlays, message content persistence conditions, social network information, and live event information. Data exchanges within the interaction system 2800 are invoked and controlled through functions available via user interfaces (UIs) of the interaction clients 2804.

Turning now specifically to the interaction server system 2810, an Application Program Interface (API) server 2822 is coupled to and provides programmatic interfaces to interaction servers 2824, making the functions of the interaction servers 2824 accessible to interaction clients 2804, other applications 2806 and third-party server 2812. The interaction servers 2824 are communicatively coupled to a database server 2826, facilitating access to a database 2828 that stores data associated with interactions processed by the interaction servers 2824. Similarly, a web server 2830 is coupled to the interaction servers 2824 and provides web-based interfaces to the interaction servers 2824. To this end, the web server 2830 processes incoming network requests over the Hypertext Transfer Protocol (HTTP) and several other related protocols.

The Application Program Interface (API) server 2822 receives and transmits interaction data (e.g., commands and message payloads) between the interaction servers 2824 and the client systems 2802 (and, for example, interaction clients 2804 and other application 2806) and the third-party server 2812. Specifically, the Application Program Interface (API) server 2822 provides a set of interfaces (e.g., routines and protocols) that can be called or queried by the interaction client 2804 and other applications 2806 to invoke functionality of the interaction servers 2824. The Application Program Interface (API) server 2822 exposes various functions supported by the interaction servers 2824, including account registration; login functionality; the sending of interaction data, via the interaction servers 2824, from a particular interaction client 2804 to another interaction client 2804; the communication of media files (e.g., images or video) from an interaction client 2804 to the interaction servers 2824; the settings of a collection of media data (e.g., a story); the retrieval of a list of friends of a user of a user system 2802; the retrieval of messages and content; the addition and deletion of entities (e.g., friends) to an entity graph (e.g., a social graph); the location of friends within a social graph; and opening an application event (e.g., relating to the interaction client 2804).

The interaction servers 2824 host multiple systems and subsystems, described below with reference to FIG. 29.

Linked Applications

Returning to the interaction client 2804, features and functions of an external resource (e.g., a linked application 2806 or applet) are made available to a user via an interface of the interaction client 2804. In this context, "external" refers to the fact that the application 2806 or applet is external to the interaction client 2804. The external resource is often provided by a third party but may also be provided by the creator or provider of the interaction client 2804. The interaction client 2804 receives a user selection of an option to launch or access features of such an external resource. The external resource may be the application 2806 installed on the user system 2802 (e.g., a "native app"), or a small-scale version of the application (e.g., an "applet") that is hosted on the user system 2802 or remote of the user system 2802 (e.g., on third-party servers 2812). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 2804. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 2804 determines whether the selected external resource is a web-based external resource or a locally-installed application 2806. In some cases, applications 2806 that are locally installed on the user system 2802 can be launched independently of and separately from the interaction client 2804, such as by selecting an icon corresponding to the application 2806 on a home screen of the user system 2802. Small-scale versions of such applications can be launched or accessed via the interaction client 2804 and, in some examples, no or limited portions of the small-scale application can be accessed outside of the interaction client 2804. The small-scale application can be launched by the interaction client 2804 receiving, from a third-party server 2812 for example, a markup-language document associated with the small-scale application and processing such a document.

In response to determining that the external resource is a locally-installed application 2806, the interaction client 2804 instructs the user system 2802 to launch the external resource by executing locally-stored code corresponding to the external resource. In response to determining that the external resource is a web-based resource, the interaction client 2804 communicates with the third-party servers 2812 (for example) to obtain a markup-language document corresponding to the selected external resource. The interaction client 2804 then processes the obtained markup-language document to present the web-based external resource within a user interface of the interaction client 2804.

The interaction client 2804 can notify a user of the user system 2802, or other users related to such a user (e.g., "friends"), of activity taking place in one or more external resources. For example, the interaction client 2804 can provide participants in a conversation (e.g., a chat session) in the interaction client 2804 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 2804, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 2804. The external resource can selectively include different media items in the responses, based on a current context of the external resource.

The interaction client 2804 can present a list of the available external resources (e.g., applications 2806 or applets) to a user to launch or access a given external resource. This list can be presented in a context-sensitive menu. For example, the icons representing different ones of the application 2806 (or applets) can vary based on how the menu is launched by the user (e.g., from a conversation interface or from a non-conversation interface).

System Architecture

Figure 29:
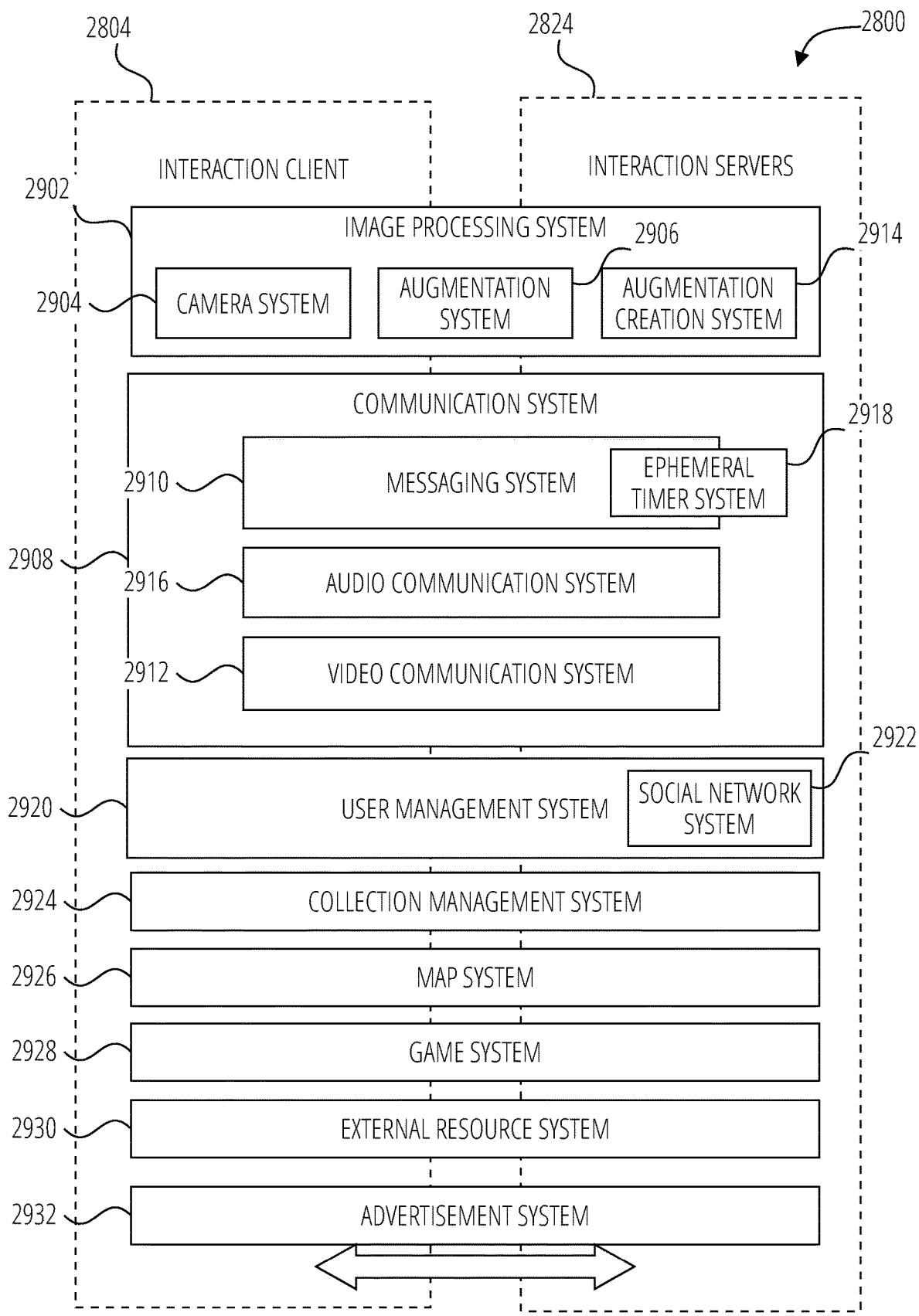
FIG. 29 is a diagrammatic representation of a messaging system, according to some examples, that has both client-side and server-side functionality.

FIG. 29 is a block diagram illustrating further details regarding the interaction system 2800, according to some examples. Specifically, the interaction system 2800 is shown to comprise the interaction client 2804 and the interaction servers 2824. The interaction system 2800 embodies multiple subsystems, which are supported on the client-side by the interaction client 2804 and on the server-side by the interaction servers 2824. Example subsystems are discussed below.

An image processing system 2902 provides various functions that enable a user to capture and augment (e.g., annotate or otherwise modify or edit) media content associated with a message.

A camera system 2904 includes control software (e.g., in a camera application) that interacts with and controls hardware camera hardware (e.g., directly or via operating system controls) of the user system 2802 to modify and augment real-time images captured and displayed via the interaction client 2804.

The augmentation system 2906 provides functions related to the generation and publishing of augmentations (e.g., media overlays) for images captured in real-time by cameras of the user system 2802 or retrieved from memory of the user system 2802. For example, the augmentation system 2906 operatively selects, presents, and displays media overlays (e.g., an image filter or an image lens) to the interaction client 2804 for the augmentation of real-time images received via the camera system 2904 or stored images retrieved from memory 3302 of a user system 2802. These augmentations are selected by the augmentation system 2906 and presented to a user of an interaction client 2804, based on a number of inputs and data, such as for example:

Geolocation of the user system 2802; and

Social network information of the user of the user system 2802.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 2802 for communication in a message, or applied to video content, such as a video content stream or feed transmitted from an interaction client 2804. As such, the image processing system 2902 may interact with, and support, the various subsystems of the communication system 2908, such as the messaging system 2910 and the video communication system 2912.

A media overlay may include text or image data that can be overlaid on top of a photograph taken by the user system 2802 or a video stream produced by the user system 2802. In some examples, the media overlay may be a location overlay (e.g., Venice beach), a name of a live event, or a name of a merchant overlay (e.g., Beach Coffee House). In further examples, the image processing system 2902 uses the geolocation of the user system 2802 to identify a media overlay that includes the name of a merchant at the geolocation of the user system 2802. The media overlay may include other indicia associated with the merchant. The media overlays may be stored in the databases 2828 and accessed through the database server 2826.

The image processing system 2902 provides a user-based publication platform that enables users to select a geolocation on a map and upload content associated with the selected geolocation. The user may also specify circumstances under which a particular media overlay should be offered to other users. The image processing system 2902 generates a media overlay that includes the uploaded content and associates the uploaded content with the selected geolocation.

The augmentation creation system 2914 supports augmented reality developer platforms and includes an application for content creators (e.g., artists and developers) to create and publish augmentations (e.g., augmented reality experiences) of the interaction client 2804. The augmentation creation system 2914 provides a library of built-in features and tools to content creators including, for example custom shaders, tracking technology, and templates.

In some examples, the augmentation creation system 2914 provides a merchant-based publication platform that enables merchants to select a particular augmentation associated with a geolocation via a bidding process. For example, the augmentation creation system 2914 associates a media overlay of the highest bidding merchant with a corresponding geolocation for a predefined amount of time.

A communication system 2908 is responsible for enabling and processing multiple forms of communication and interaction within the interaction system 2800 and includes a messaging system 2910, an audio communication system 2916, and a video communication system 2912. The messaging system 2910 is responsible for enforcing the temporary or time-limited access to content by the interaction clients 2804. The messaging system 2910 incorporates multiple timers (e.g., within an ephemeral timer system 2918) that, based on duration and display parameters associated with a message or collection of messages (e.g., a story), selectively enable access (e.g., for presentation and display) to messages and associated content via the interaction client 2804. Further details regarding the operation of the ephemeral timer system 2918 are provided below. The audio communication system 2916 enables and supports audio communications (e.g., real-time audio chat) between multiple interaction clients 2804. Similarly, the video communication system 2912 enables and supports video communications (e.g., real-time video chat) between multiple interaction clients 2804.

A user management system 2920 is operationally responsible for the management of user data and profiles, and includes a social network system 2922 that maintains information regarding relationships between users of the interaction system 2800.

A collection management system 2924 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 2924 may also be responsible for publishing an icon that provides notification of a particular collection to the user interface of the interaction client 2804. The collection management system 2924 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 2924 employs machine vision (or image recognition technology) and content rules to curate a content collection automatically. In certain examples, compensation may be paid to a user to include user-generated content into a collection. In such cases, the collection management system 2924 operates to automatically make payments to such users to use their content.

A map system 2926 provides various geographic location functions and supports the presentation of map-based media content and messages by the interaction client 2804. For example, the map system 2926 enables the display of user icons or avatars (e.g., stored in profile data 3002) on a map to indicate a current or past location of "friends" of a user, as well as media content (e.g., collections of messages including photographs and videos) generated by such friends, within the context of a map. For example, a message posted by a user to the interaction system 2800 from a specific geographic location may be displayed within the context of a map at that particular location to "friends" of a specific user on a map interface of the interaction client 2804. A user can furthermore share his or her location and status information (e.g., using an appropriate status avatar) with other users of the interaction system 2800 via the interaction client 2804, with this location and status information being similarly displayed within the context of a map interface of the interaction client 2804 to selected users.

A game system 2928 provides various gaming functions within the context of the interaction client 2804. The interaction client 2804 provides a game interface providing a list of available games that can be launched by a user within the context of the interaction client 2804 and played with other users of the interaction system 2800. The interaction system 2800 further enables a particular user to invite other users to participate in the play of a specific game by issuing invitations to such other users from the interaction client 2804. The interaction client 2804 also supports audio, video, and text messaging (e.g., chats) within the context of gameplay, provides a leaderboard for the games, and also supports the provision of in-game rewards (e.g., coins and items).

An external resource system 2930 provides an interface for the interaction client 2804 to communicate with remote servers (e.g., third-party servers 2812) to launch or access external resources, i.e., applications or applets. Each third-party server 2812 hosts, for example, a markup language (e.g., HTML5) based application or a small-scale version of an application (e.g., game, utility, payment, or ride-sharing application). The interaction client 2804 may launch a web-based resource (e.g., application) by accessing the HTML5 file from the third-party servers 2812 associated with the web-based resource. Applications hosted by third-party servers 2812 are programmed in JavaScript leveraging a Software Development Kit (SDK) provided by the interaction servers 2824. The SDK includes Application Programming Interfaces (APIs) with functions that can be called or invoked by the web-based application. The interaction servers 2824 host a JavaScript library that provides a given external resource access to specific user data of the interaction client 2804. HTML5 is an example of technology for programming games, but applications and resources programmed based on other technologies can be used.

To integrate the functions of the SDK into the web-based resource, the SDK is downloaded by the third-party server 2812 from the interaction servers 2824 or is otherwise received by the third-party server 2812. Once downloaded or received, the SDK is included as part of the application code of a web-based external resource. The code of the web-based resource can then call or invoke certain functions of the SDK to integrate features of the interaction client 2804 into the web-based resource.

The SDK stored on the interaction server system 2810 effectively provides the bridge between an external resource (e.g., applications 2806 or applets) and the interaction client 2804. This gives the user a seamless experience of communicating with other users on the interaction client 2804 while also preserving the look and feel of the interaction client 2804. To bridge communications between an external resource and an interaction client 2804, the SDK facilitates communication between third-party servers 2812 and the interaction client 2804. A Web ViewJavaScriptBridge running on a user system 2802 establishes two one-way communication channels between an external resource and the interaction client 2804. Messages are sent between the external resource and the interaction client 2804 via these communication channels asynchronously. Each SDK function invocation is sent as a message and callback. Each SDK function is implemented by constructing a unique callback identifier and sending a message with that callback identifier.

By using the SDK, not all information from the interaction client 2804 is shared with third-party servers 2812. The SDK limits which information is shared based on the needs of the external resource. Each third-party server 2812 provides an HTML5 file corresponding to the web-based external resource to interaction servers 2824. The interaction servers 2824 can add a visual representation (such as a box art or other graphic) of the web-based external resource in the interaction client 2804. Once the user selects the visual representation or instructs the interaction client 2804 through a GUI of the interaction client 2804 to access features of the web-based external resource, the interaction client 2804 obtains the HTML5 file and instantiates the resources to access the features of the web-based external resource.

The interaction client 2804 presents a graphical user interface (e.g., a landing page or title screen) for an external resource. During, before, or after presenting the landing page or title screen, the interaction client 2804 determines whether the launched external resource has been previously authorized to access user data of the interaction client 2804. In response to determining that the launched external resource has been previously authorized to access user data of the interaction client 2804, the interaction client 2804 presents another graphical user interface of the external resource that includes functions and features of the external resource. In response to determining that the launched external resource has not been previously authorized to access user data of the interaction client 2804, after a threshold period of time (e.g., 3 seconds) of displaying the landing page or title screen of the external resource, the interaction client 2804 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 2804 adds the external resource to a list of authorized external resources and allows the external resource to access user data from the interaction client 2804. The external resource is authorized by the interaction client 2804 to access the user data under an OAuth 2 framework.

The interaction client 2804 controls the type of user data that is shared with external resources based on the type of external resource being authorized. For example, external resources that include full-scale applications (e.g., an application 2806) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 2932 operationally enables the purchasing of advertisements by third parties for presentation to end-users via the interaction clients 2804 and also handles the delivery and presentation of these advertisements.

Data Architecture

Figure 30:
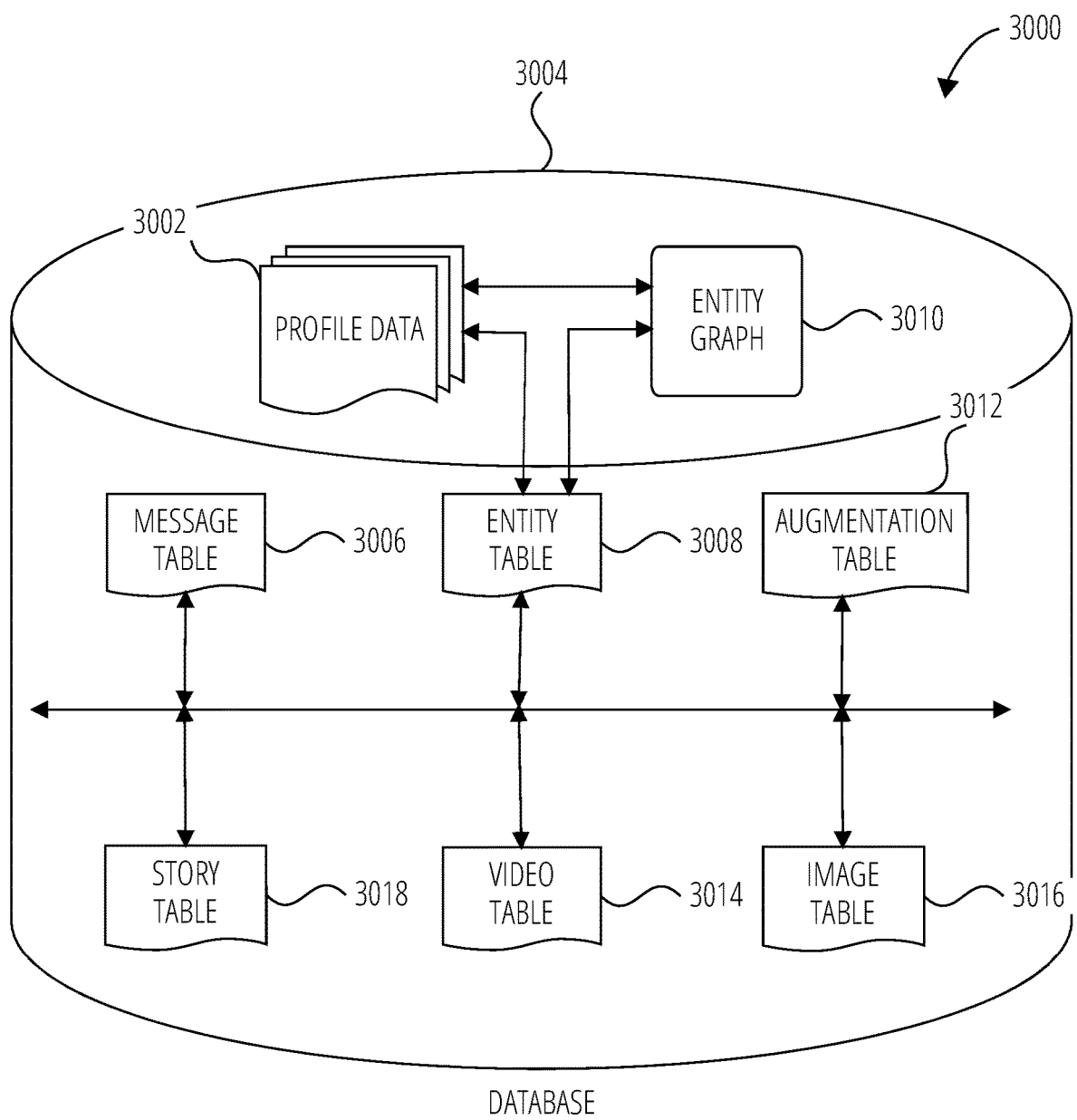
FIG. 30 is a diagrammatic representation of a data structure as maintained in a database, according to some examples.

FIG. 30 is a schematic diagram illustrating data structures 3000, which may be stored in the database 3004 of the interaction server system 2810, according to certain examples. While the content of the database 3004 is shown to comprise multiple tables, it will be appreciated that the data could be stored in other types of data structures (e.g., as an object-oriented database).

The database 3004 includes message data stored within a message table 3006. This message data includes, for any particular message, at least message sender data, message recipient (or receiver) data, and a payload. Further details regarding information that may be included in a message, and included within the message data stored in the message table 3006, are described below with reference to FIG. 30.

An entity table 3008 stores entity data, and is linked (e.g., referentially) to an entity graph 3010 and profile data 3002. Entities for which records are maintained within the entity table 3008 may include individuals, corporate entities, organizations, objects, places, events, and so forth. Regardless of entity type, any entity regarding which the interaction server system 2810 stores data may be a recognized entity. Each entity is provided with a unique identifier, as well as an entity type identifier (not shown).

The entity graph 3010 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 2800.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 3008. Such privacy settings may be applied to all types of relationships within the context of the interaction system 2800, or may selectively be applied to only certain types of relationships.

The profile data 3002 stores multiple types of profile data about a particular entity. The profile data 3002 may be selectively used and presented to other users of the interaction system 2800 based on privacy settings specified by a particular entity. Where the entity is an individual, the profile data 3002 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 2800, and on map interfaces displayed by interaction clients 2804 to other users. The collection of avatar representations may include "status avatars," which present a graphical representation of a status or activity that the user may select to communicate at a particular time.

Where the entity is a group, the profile data 3002 for the group may similarly include one or more avatar representations associated with the group, in addition to the group name, members, and various settings (e.g., notifications) for the relevant group.

The database 3004 also stores augmentation data, such as overlays or filters, in an augmentation table 3012. The augmentation data is associated with and applied to videos (for which data is stored in a video table 3014) and images (for which data is stored in an image table 3016).

Filters, in some examples, are overlays that are displayed as overlaid on an image or video during presentation to a recipient user. Filters may be of various types, including user-selected filters from a set of filters presented to a sending user by the interaction client 2804 when the sending user is composing a message. Other types of filters include geolocation filters (also known as geo-filters), which may be presented to a sending user based on geographic location. For example, geolocation filters specific to a neighborhood or special location may be presented within a user interface by the interaction client 2804, based on geolocation information determined by a Global Positioning System (GPS) unit of the user system 2802.

Another type of filter is a data filter, which may be selectively presented to a sending user by the interaction client 2804 based on other inputs or information gathered by the user system 2802 during the message creation process. Examples of data filters include current temperature at a specific location, a current speed at which a sending user is traveling, battery life for a user system 2802, or the current time.

Other augmentation data that may be stored within the image table 3016 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 2802 and then displayed on a screen of the user system 2802 with the modifications. This also includes modifications to stored content, such as video clips in a collection or group that may be modified. For example, in a user system 2802 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 2802 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 2802) and perform complex image manipulations locally on the user system 2802 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 2802.

In some examples, a computer animation model to transform image data can be used by a system where a user may capture an image or video stream of the user (e.g., a selfie) using the user system 2802 having a neural network operating as part of an interaction client 2804 operating on the user system 2802. The transformation system operating within the interaction client 2804 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 2802 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 3018 stores data regarding collections of messages and associated image, video, or audio data, which are compiled into a collection (e.g., a story or a gallery). The creation of a particular collection may be initiated by a particular user (e.g., each user for which a record is maintained in the entity table 3008). A user may create a "personal story" in the form of a collection of content that has been created and sent/broadcast by that user. To this end, the user interface of the interaction client 2804 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 2804, to contribute content to a particular live story. The live story may be identified to the user by the interaction client 2804, based on his or her location. The end result is a "live story" told from a community perspective.

A further type of content collection is known as a "location story," which enables a user whose user system 2802 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 3014 stores video data that, in some examples, is associated with messages for which records are maintained within the message table 3006. Similarly, the image table 3016 stores image data associated with messages for which message data is stored in the entity table 3008. The entity table 3008 may associate various augmentations from the augmentation table 3012 with various images and videos stored in the image table 3016 and the video table 3014.

Data Communications Architecture

Figure 31:
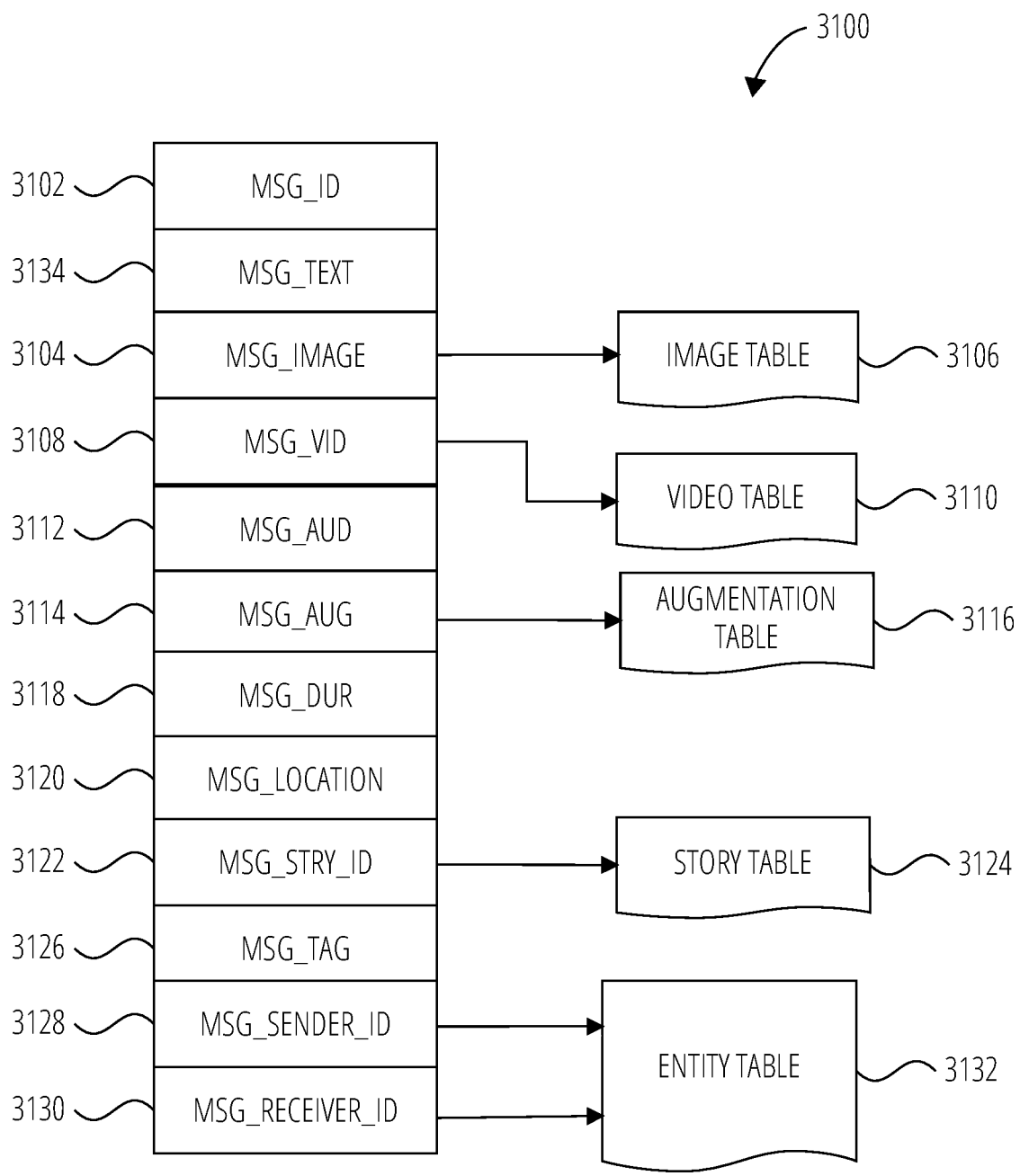
FIG. 31 is a diagrammatic representation of a message, according to some examples.

FIG. 31 is a schematic diagram illustrating a structure of a message 3100, according to some examples, generated by an interaction client 2804 for communication to a further interaction client 2804 via the interaction servers 2824. The content of a particular message 3100 is used to populate the message table 3006 stored within the database 3004, accessible by the interaction servers 2824. Similarly, the content of a message 3100 is stored in memory as "in-transit" or "in-flight" data of the user system 2802 or the interaction servers 2824. A message 3100 is shown to include the following example components:

- Message identifier 3102: a unique identifier that identifies the message 3100.
- Message text payload 3134: text, to be generated by a user via a user interface of the user system 2802, and that is included in the message 3100.
- Message image payload 3104: image data, captured by a camera component of a user system 2802 or retrieved from a memory component of a user system 2802, and that is included in the message 3100. Image data for a sent or received message 3100 may be stored in the image table 3106.
- Message video payload 3108: video data, captured by a camera component or retrieved from a memory component of the user system 2802, and that is included in the message 3100. Video data for a sent or received message 3100 may be stored in the video table 3110.
- Message audio payload 3112: audio data, captured by a microphone or retrieved from a memory component of the user system 2802, and that is included in the message 3100.
- Message augmentation data 3114: augmentation data (e.g., filters, stickers, or other annotations or enhancements) that represents augmentations to be applied to message image payload 3104, message video payload 3108, or message audio payload 3112 of the message 3100. Augmentation data for a sent or received message 3100 may be stored in the augmentation table 3116.
- Message duration parameter 3118: parameter value indicating, in seconds, the amount of time for which content of the message (e.g., the message image payload 3104, message video payload 3108, message audio payload 3112) is to be presented or made accessible to a user via the interaction client 2804.
- Message geolocation parameter 3120: geolocation data (e.g., latitudinal and longitudinal coordinates) associated with the content payload of the message. Multiple message geolocation parameter 3120 values may be included in the payload, each of these parameter values being associated with respect to content items included in the content (e.g., a specific image within the message image payload 3104, or a specific video in the message video payload 3108).
- Message story identifier 3122: identifier values identifying one or more content collections (e.g., "stories" identified in the story table 3124) with which a particular content item in the message image payload 3104 of the message 3100 is associated. For example, multiple images within the message image payload 3104 may each be associated with multiple content collections using identifier values.
- Message tag 3126: each message 3100 may be tagged with multiple tags, each of which is indicative of the subject matter of content included in the message payload. For example, where a particular image included in the message image payload 3104 depicts an animal (e.g., a lion), a tag value may be included within the message tag 3126 that is indicative of the relevant animal. Tag values may be generated manually, based on user input, or may be automatically generated using, for example, image recognition.
- Message sender identifier 3128: an identifier (e.g., a messaging system identifier, email address, or device identifier) indicative of a user of the user system 2802 on which the message 3100 was generated and from which the message 3100 was sent.
- Message receiver identifier 3130: an identifier (e.g., a messaging system identifier, email address, or device identifier) indicative of a user of the user system 2802 to which the message 3100 is addressed.

The contents (e.g., values) of the various components of message 3100 may be pointers to locations in tables within which content data values are stored. For example, an image value in the message image payload 3104 may be a pointer to (or address of) a location within an image table 3106. Similarly, values within the message video payload 3108 may point to data stored within a video table 3110, values stored within the message augmentation data 418 may point to data stored in an augmentation table 3116, values stored within the message story identifier 3122 may point to data stored in a story table 3124, and values stored within the message sender identifier 3128 and the message receiver identifier 3130 may point to user records stored within an entity table 3132.

Time-Based Access Limitation Architecture

Figure 32:
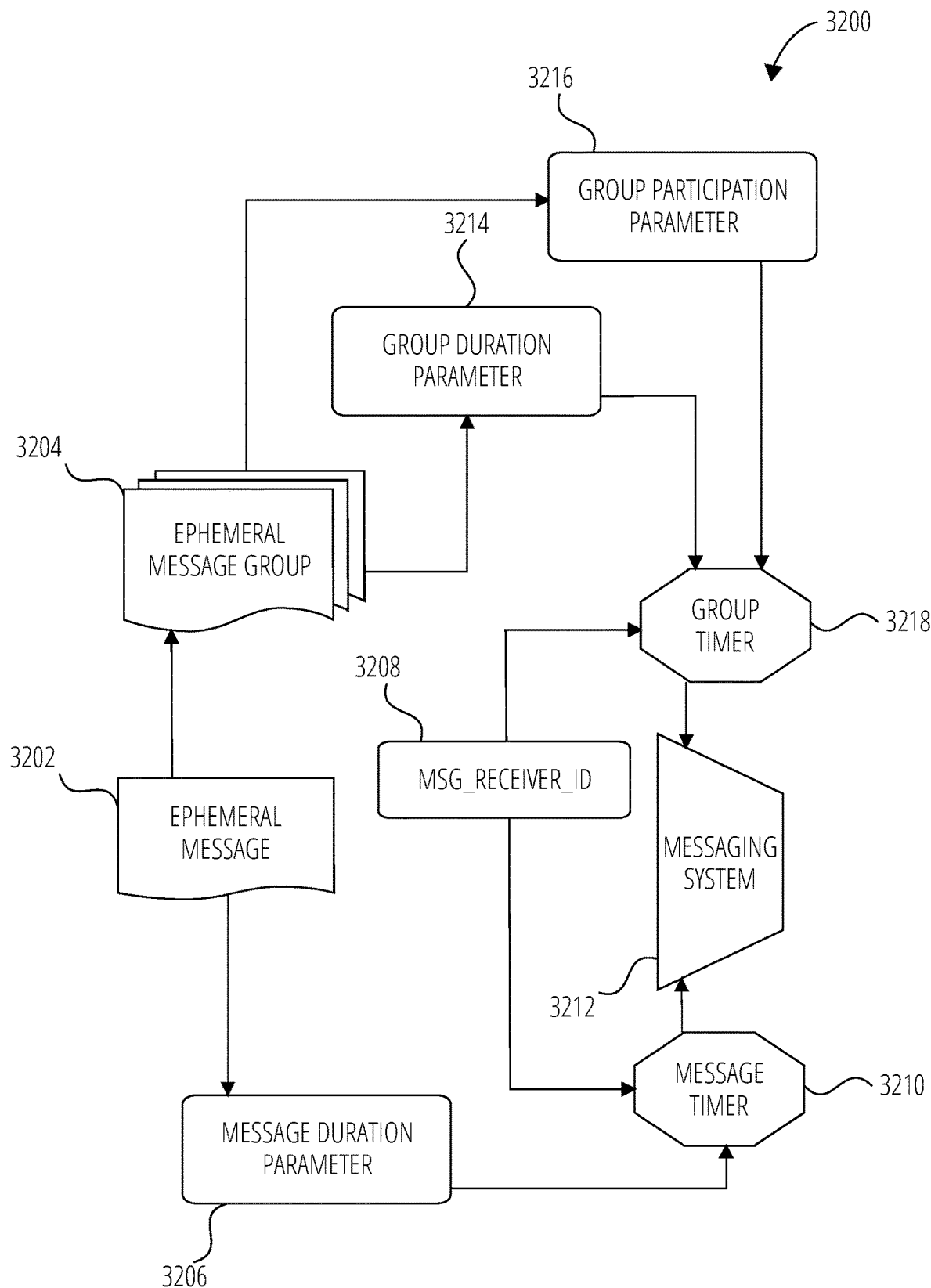
FIG. 32 is a flowchart for an access-limiting process, according to some examples.

FIG. 32 is a schematic diagram illustrating an access-limiting process 3200, in terms of which access to content (e.g., an ephemeral message 3202 and associated multimedia payload of data) or a content collection (e.g., an ephemeral message group 3204) may be time-limited (e.g., made ephemeral).

An ephemeral message 3202 is shown to be associated with a message duration parameter 3206, the value of which determines the amount of time that the ephemeral message 3202 will be displayed to a receiving user of the ephemeral message 3202 by the interaction client 2804. In some examples, an ephemeral message 3202 is viewable by a receiving user for up to a maximum of 10 seconds, depending on the amount of time that the sending user specifies using the message duration parameter 3206.

The message duration parameter 3206 and the message receiver identifier 3208 are shown to be inputs to a message timer 3210, which is responsible for determining the amount of time that the ephemeral message 3202 is shown to a particular receiving user identified by the message receiver identifier 3208. In particular, the ephemeral message 3202 will be shown to the relevant receiving user for a time period determined by the value of the message duration parameter 3206. The message timer 3210 is shown to provide output to a more generalized messaging system 3212, which is responsible for the overall timing of display of content (e.g., an ephemeral message 3202) to a receiving user.

The ephemeral message 3202 is shown in FIG. 32 to be included within an ephemeral message group 3204 (e.g., a collection of messages in a personal story, or an event story). The ephemeral message group 3204 has an associated group duration parameter 3214, a value of which determines a time duration for which the ephemeral message group 3204 is presented and accessible to users of the interaction system 2800. The group duration parameter 3214, for example, may be the duration of a music concert, where the ephemeral message group 3204 is a collection of content pertaining to that concert. Alternatively, a user (either the owning user or a curator user) may specify the value for the group duration parameter 3214 when performing the setup and creation of the ephemeral message group 3204.

Additionally, each ephemeral message 3202 within the ephemeral message group 3204 has an associated group participation parameter 3216, a value of which determines the duration of time for which the ephemeral message 3202 will be accessible within the context of the ephemeral message group 3204. Accordingly, a particular ephemeral message group 3204 may "expire" and become inaccessible within the context of the ephemeral message group 3204 prior to the ephemeral message group 3204 itself expiring in terms of the group duration parameter 3214. The group duration parameter 3214, group participation parameter 3216, and message receiver identifier 3208 each provide input to a group timer 3218, which operationally determines, firstly, whether a particular ephemeral message 3202 of the ephemeral message group 3204 will be displayed to a particular receiving user and, if so, for how long. Note that the ephemeral message group 3204 is also aware of the identity of the particular receiving user as a result of the message receiver identifier 3208.

Accordingly, the group timer 3218 operationally controls the overall lifespan of an associated ephemeral message group 3204 as well as an individual ephemeral message 3202 included in the ephemeral message group 3204. In some examples, each and every ephemeral message 3202 within the ephemeral message group 3204 remains viewable and accessible for a time period specified by the group duration parameter 3214. In a further example, a certain ephemeral message 3202 may expire within the context of ephemeral message group 3204 based on a group participation parameter 3216. Note that a message duration parameter 3206 may still determine the duration of time for which a particular ephemeral message 3202 is displayed to a receiving user, even within the context of the ephemeral message group 3204. Accordingly, the message duration parameter 3206 determines the duration of time that a particular ephemeral message 3202 is displayed to a receiving user regardless of whether the receiving user is viewing that ephemeral message 3202 inside or outside the context of an ephemeral message group 3204.

The messaging system 3212 may furthermore operationally remove a particular ephemeral message 3202 from the ephemeral message group 3204 based on a determination that it has exceeded an associated group participation parameter 3216. For example, when a sending user has established a group participation parameter 3216 of 24 hours from posting, the messaging system 3212 will remove the relevant ephemeral message 3202 from the ephemeral message group 3204 after the specified 24 hours. The messaging system 3212 also operates to remove an ephemeral message group 3204 when either the group participation parameter 3216 for each and every ephemeral message 3202 within the ephemeral message group 3204 has expired, or when the ephemeral message group 3204 itself has expired in terms of the group duration parameter 3214.

In certain use cases, a creator of a particular ephemeral message group 3204 may specify an indefinite group duration parameter 3214. In this case, the expiration of the group participation parameter 3216 for the last remaining ephemeral message 3202 within the ephemeral message group 3204 will determine when the ephemeral message group 3204 itself expires. In this case, a new ephemeral message 3202, added to the ephemeral message group 3204, with a new group participation parameter 3216, effectively extends the life of an ephemeral message group 3204 to equal the value of the group participation parameter 3216.

Responsive to the messaging system 3212 determining that an ephemeral message group 3204 has expired (e.g., is no longer accessible), the messaging system 3212 communicates with the interaction system 2800 (and, for example, specifically the interaction client 2804) to cause an indicium (e.g., an icon) associated with the relevant ephemeral message group 3204 to no longer be displayed within a user interface of the interaction client 2804. Similarly, when the messaging system 3212 determines that the message duration parameter 3206 for a particular ephemeral message 3202 has expired, the messaging system 3212 causes the interaction client 2804 to no longer display an indicium (e.g., an icon or textual identification) associated with the ephemeral message 3202.

System with Head-Wearable Apparatus

Figure 33:
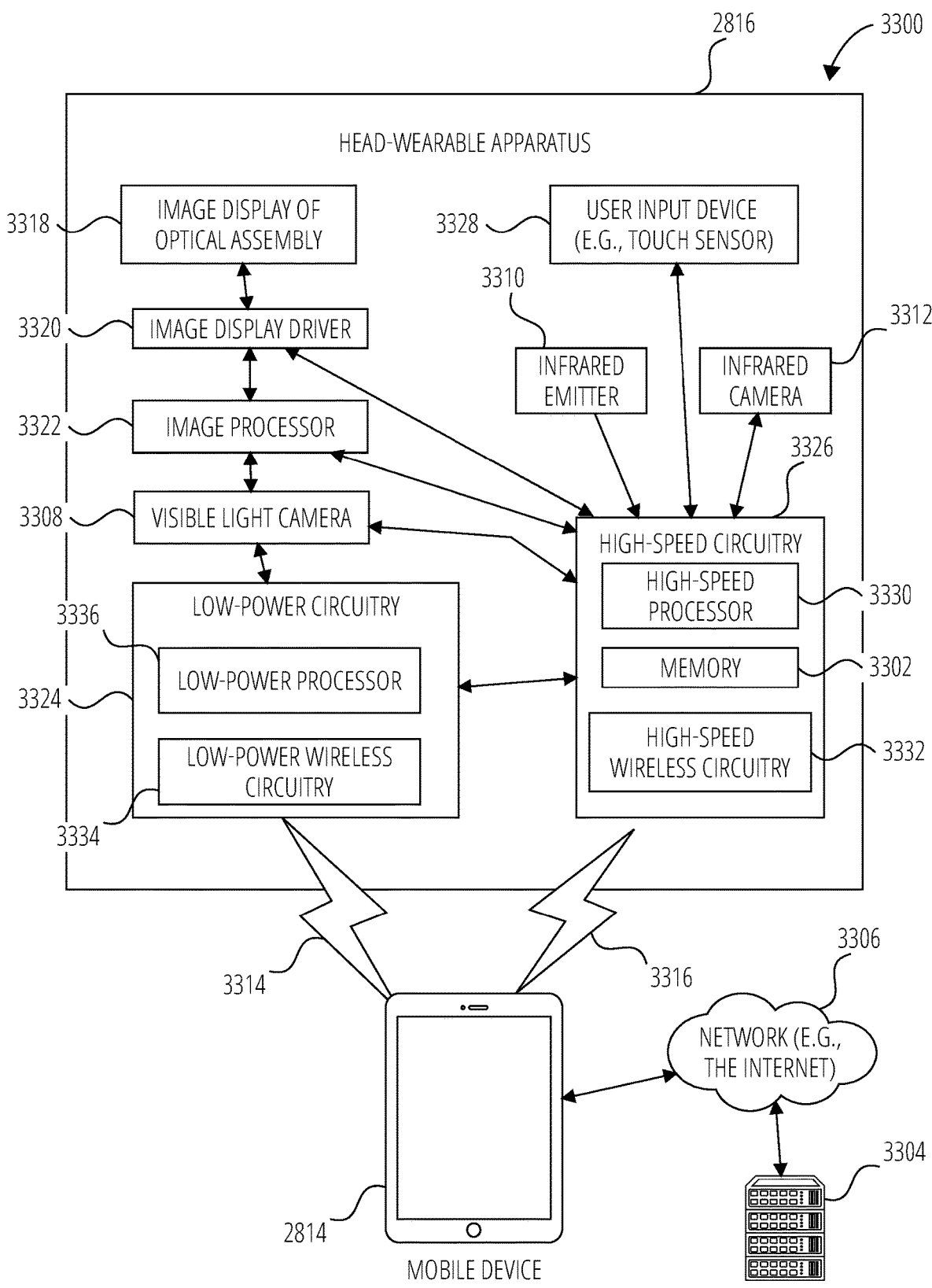
FIG. 33 illustrates a system in which the head-wearable apparatus, according to some examples.

FIG. 33 illustrates a system 3300 including a head-wearable apparatus 2816 with a selector input device, according to some examples. FIG. 33 is a high-level functional block diagram of an example head-wearable apparatus 2816 communicatively coupled to a mobile device 2814 and various server systems 3304 (e.g., the interaction server system 2810) via various networks 2808.

The head-wearable apparatus 2816 includes one or more cameras, each of which may be, for example, a visible light camera 3308, an infrared emitter 3310, and an infrared camera 3312.

The mobile device 2814 connects with head-wearable apparatus 2816 using both a low-power wireless connection 3314 and a high-speed wireless connection 3316. The mobile device 2814 is also connected to the server system 3304 and the network 3306.

The head-wearable apparatus 2816 further includes two image displays of the image display of optical assembly 3318. The two image displays of optical assembly 3318 include one associated with the left lateral side and one associated with the right lateral side of the head-wearable apparatus 2816. The head-wearable apparatus 2816 also includes an image display driver 3320, an image processor 3322, low-power circuitry 3324, and high-speed circuitry 3326. The image display of optical assembly 3318 is for presenting images and videos, including an image that can include a graphical user interface to a user of the head-wearable apparatus 2816.

The image display driver 3320 commands and controls the image display of optical assembly 3318. The image display driver 3320 may deliver image data directly to the image display of optical assembly 3318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 2816 includes a frame and stems (or temples) extending from a lateral side of the frame. The head-wearable apparatus 2816 further includes a user input device 3328 (e.g., touch sensor or push button), including an input surface on the head-wearable apparatus 2816. The user input device 3328 (e.g., touch sensor or push button) is to receive from the user an input selection to manipulate the graphical user interface of the presented image.

The components shown in FIG. 33 for the head-wearable apparatus 2816 are located on one or more circuit boards, for example a PCB or flexible PCB, in the rims or temples. Alternatively, or additionally, the depicted components can be located in the chunks, frames, hinges, or bridge of the head-wearable apparatus 2816. Left and right visible light cameras 3308 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 2816 includes a memory 3302, which stores instructions to perform a subset or all of the functions described herein. The memory 3302 can also include storage device.

As shown in FIG. 33, the high-speed circuitry 3326 includes a high-speed processor 3330, a memory 3302, and high-speed wireless circuitry 3332. In some examples, the image display driver 3320 is coupled to the high-speed circuitry 3326 and operated by the high-speed processor 3330 in order to drive the left and right image displays of the image display of optical assembly 3318. The high-speed processor 3330 may be any processor capable of managing high-speed communications and operation of any general computing system needed for the head-wearable apparatus 2816. The high-speed processor 3330 includes processing resources needed for managing high-speed data transfers on a high-speed wireless connection 3316 to a wireless local area network (WLAN) using the high-speed wireless circuitry 3332. In certain examples, the high-speed processor 3330 executes an operating system such as a LINUX operating system or other such operating system of the head-wearable apparatus 2816, and the operating system is stored in the memory 3302 for execution. In addition to any other responsibilities, the high-speed processor 3330 executing a software architecture for the head-wearable apparatus 2816 is used to manage data transfers with high-speed wireless circuitry 3332. In certain examples, the high-speed wireless circuitry 3332 is configured to implement Institute of Electrical and Electronic Engineers (IEEE) 802.11 communication standards, also referred to herein as WiFi. In some examples, other high-speed communications standards may be implemented by the high-speed wireless circuitry 3332.

The low-power wireless circuitry 3334 and the high-speed wireless circuitry 3332 of the head-wearable apparatus 2816 can include short-range transceivers (Bluetooth™) and wireless wide, local, or wide area network transceivers (e.g., cellular or WiFi). Mobile device 2814, including the transceivers communicating via the low-power wireless connection 3314 and the high-speed wireless connection 3316, may be implemented using details of the architecture of the head-wearable apparatus 2816, as can other elements of the network 3306.

The memory 3302 includes any storage device capable of storing various data and applications, including, among other things, camera data generated by the left and right visible light cameras 3308, the infrared camera 3312, and the image processor 3322, as well as images generated for display by the image display driver 3320 on the image displays of the image display of optical assembly 3318. While the memory 3302 is shown as integrated with high-speed circuitry 3326, in some examples, the memory 3302 may be an independent standalone element of the head-wearable apparatus 2816. In certain such examples, electrical routing lines may provide a connection through a chip that includes the high-speed processor 3330 from the image processor 3322 or the low-power processor 3336 to the memory 3302. In some examples, the high-speed processor 3330 may manage addressing of the memory 3302 such that the low-power processor 3336 will boot the high-speed processor 3330 any time that a read or write operation involving memory 3302 is needed.

As shown in FIG. 33, the low-power processor 3336 or high-speed processor 3330 of the head-wearable apparatus 2816 can be coupled to the camera (visible light camera 3308, infrared emitter 3310, or infrared camera 3312), the image display driver 3320, the user input device 3328 (e.g., touch sensor or push button), and the memory 3302.

The head-wearable apparatus 2816 is connected to a host computer. For example, the head-wearable apparatus 2816 is paired with the mobile device 2814 via the high-speed wireless connection 3316 or connected to the server system 3304 via the network 3306. The server system 3304 may be one or more computing devices as part of a service or network computing system, for example, that includes a processor, a memory, and network communication interface to communicate over the network 3306 with the mobile device 2814 and the head-wearable apparatus 2816.

The mobile device 2814 includes a processor and a network communication interface coupled to the processor. The network communication interface allows for communication over the network 3306, low-power wireless connection 3314, or high-speed wireless connection 3316. Mobile device 2814 can further store at least portions of the instructions for generating binaural audio content in the mobile device 2814's memory to implement the functionality described herein.

Output components of the head-wearable apparatus 2816 include visual components, such as a display such as a liquid crystal display (LCD), a plasma display panel (PDP), a light-emitting diode (LED) display, a projector, or a waveguide. The image displays of the optical assembly are driven by the image display driver 3320. The output components of the head-wearable apparatus 2816 further include acoustic components (e.g., speakers), haptic components (e.g., a vibratory motor), other signal generators, and so forth. The input components of the head-wearable apparatus 2816, the mobile device 2814, and server system 3304, such as the user input device 3328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 2816 may also include additional peripheral device elements. Such peripheral device elements may include biometric sensors, additional sensors, or display elements integrated with the head-wearable apparatus 2816. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 3314 and high-speed wireless connection 3316 from the mobile device 2814 via the low-power wireless circuitry 3334 or high-speed wireless circuitry 3332.

Machine Architecture

Figure 34:
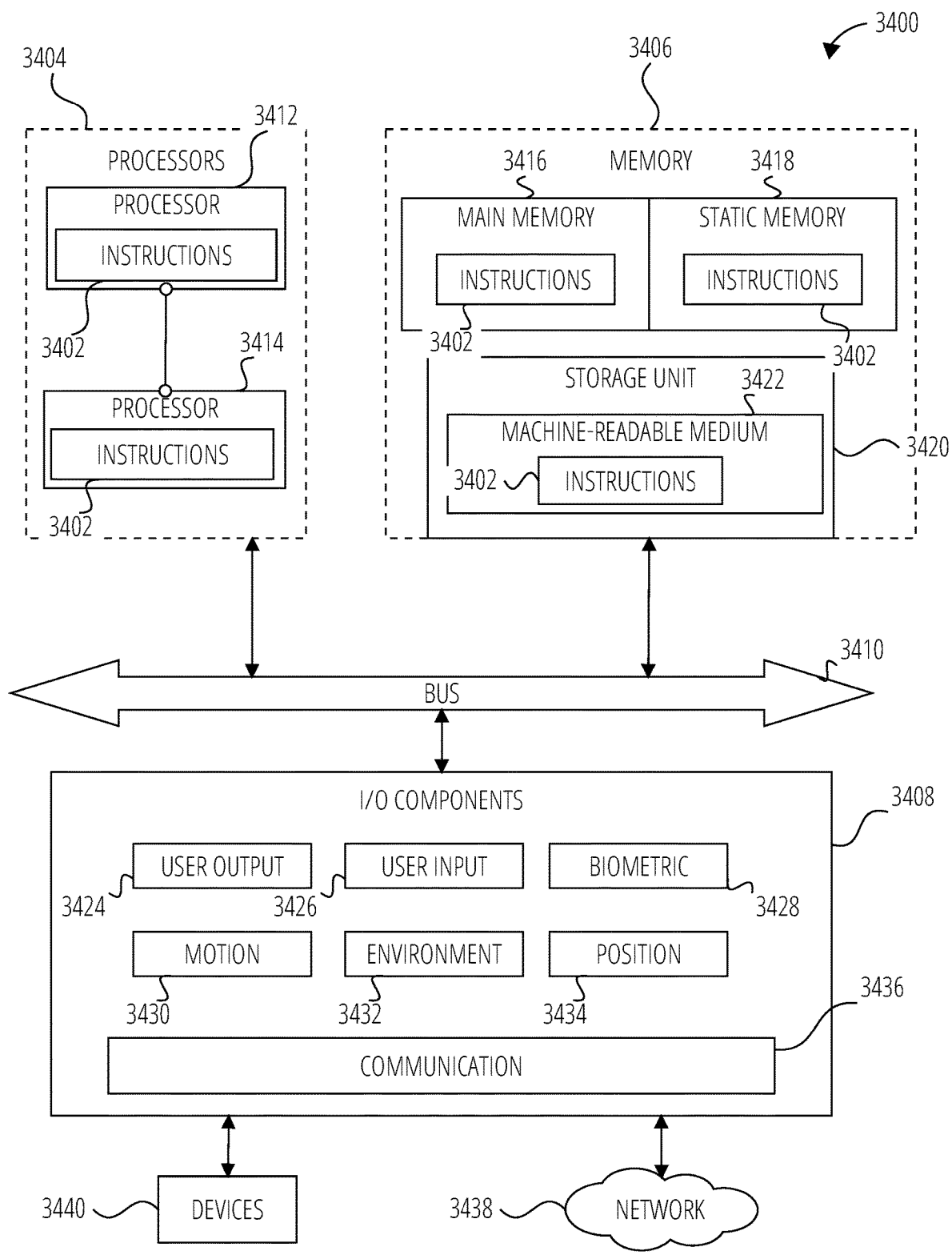
FIG. 34 is a diagrammatic representation of a machine in the form of a computer system within which a set of instructions may be executed to cause the machine to perform any one or more of the methodologies discussed herein, according to some examples.

FIG. 34 is a diagrammatic representation of the machine 3400 within which instructions 3402 (e.g., software, a program, an application, an applet, an app, or other executable code) for causing the machine 3400 to perform any one or more of the methodologies discussed herein may be executed. For example, the instructions 3402 may cause the machine 3400 to execute any one or more of the methods described herein. The instructions 3402 transform the general, non-programmed machine 3400 into a particular machine 3400 programmed to carry out the described and illustrated functions in the manner described. The machine 3400 may operate as a standalone device or may be coupled (e.g., networked) to other machines. In a networked deployment, the machine 3400 may operate in the capacity of a server machine or a client machine in a server-client network environment, or as a peer machine in a peer-to-peer (or distributed) network environment. The machine 3400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 3402, sequentially or otherwise, that specify actions to be taken by the machine 3400. Further, while a single machine 3400 is illustrated, the term "machine" shall also be taken to include a collection of machines that individually or jointly execute the instructions 3402 to perform any one or more of the methodologies discussed herein. The machine 3400, for example, may comprise the user system 2802 or any one of multiple server devices forming part of the interaction server system 2810. In some examples, the machine 3400 may also comprise both client and server systems, with certain operations of a particular method or algorithm being performed on the server-side and with certain operations of the particular method or algorithm being performed on the client-side.

The machine 3400 may include processors 3404, memory 3406, and input/output I/O components 3408, which may be configured to communicate with each other via a bus 3410. In an example, the processors 3404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 3412 and a processor 3414 that execute the instructions 3402. The term "processor" is intended to include multi-core processors that may comprise two or more independent processors (sometimes referred to as "cores") that may execute instructions contemporaneously. Although FIG. 34 shows multiple processors 3404, the machine 3400 may include a single processor with a single-core, a single processor with multiple cores (e.g., a multi-core processor), multiple processors with a single core, multiple processors with multiples cores, or any combination thereof.

The memory 3406 includes a main memory 3416, a static memory 3418, and a storage unit 3420, both accessible to the processors 3404 via the bus 3410. The main memory 3406, the static memory 3418, and storage unit 3420 store the instructions 3402 embodying any one or more of the methodologies or functions described herein. The instructions 3402 may also reside, completely or partially, within the main memory 3416, within the static memory 3418, within machine-readable medium 3422 within the storage unit 3420, within at least one of the processors 3404 (e.g., within the processor's cache memory), or any suitable combination thereof, during execution thereof by the machine 3400.

The I/O components 3408 may include a wide variety of components to receive input, provide output, produce output, transmit information, exchange information, capture measurements, and so on. The specific I/O components 3408 that are included in a particular machine will depend on the type of machine. For example, portable machines such as mobile phones may include a touch input device or other such input mechanisms, while a headless server machine will likely not include such a touch input device. It will be appreciated that the I/O components 3408 may include many other components that are not shown in FIG. 34. In various examples, the I/O components 3408 may include user output components 3424 and user input components 3426. The user output components 3424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 3426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 3408 may include biometric components 3428, motion components 3430, environmental components 3432, or position components 3434, among a wide array of other components. For example, the biometric components 3428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3430 include acceleration sensor components (e.g., accelerometer), gravitation sensor components, rotation sensor components (e.g., gyroscope).

The environmental components 3432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 2802 may have a camera system comprising, for example, front cameras on a front surface of the user system 2802 and rear cameras on a rear surface of the user system 2802. The front cameras may, for example, be used to capture still images and video of a user of the user system 2802 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 2802 may also include a 360° camera for capturing 360° photographs and videos.

Further, the camera system of the user system 2802 may include dual rear cameras (e.g., a primary camera as well as a depth-sensing camera), or even triple, quad or penta rear camera configurations on the front and rear sides of the user system 2802. These multiple cameras systems may include a wide camera, an ultra-wide camera, a telephoto camera, a macro camera, and a depth sensor, for example.

The position components 3434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3408 further include communication components 3436 operable to couple the machine 3400 to a network 3438 or devices 3440 via respective coupling or connections. For example, the communication components 3436 may include a network interface component or another suitable device to interface with the network 3438. In further examples, the communication components 3436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3440 may be another machine or any of a wide variety of peripheral devices (e.g., a peripheral device coupled via a USB).

Moreover, the communication components 3436 may detect identifiers or include components operable to detect identifiers. For example, the communication components 3436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3436, such as location via Internet Protocol (IP) geolocation, location via Wi-Fi® signal triangulation, location via detecting an NFC beacon signal that may indicate a particular location, and so forth.

The various memories (e.g., main memory 3416, static memory 3418, and memory of the processors 3404) and storage unit 3420 may store one or more sets of instructions and data structures (e.g., software) embodying or used by any one or more of the methodologies or functions described herein. These instructions (e.g., the instructions 3402), when executed by processors 3404, cause various operations to implement the disclosed examples.

The instructions 3402 may be transmitted or received over the network 3438, using a transmission medium, via a network interface device (e.g., a network interface component included in the communication components 3436) and using any one of several well-known transfer protocols (e.g., hypertext transfer protocol (HTTP)). Similarly, the instructions 3402 may be transmitted or received using a transmission medium via a coupling (e.g., a peer-to-peer coupling) to the devices 3440.

Software Architecture

Figure 35:
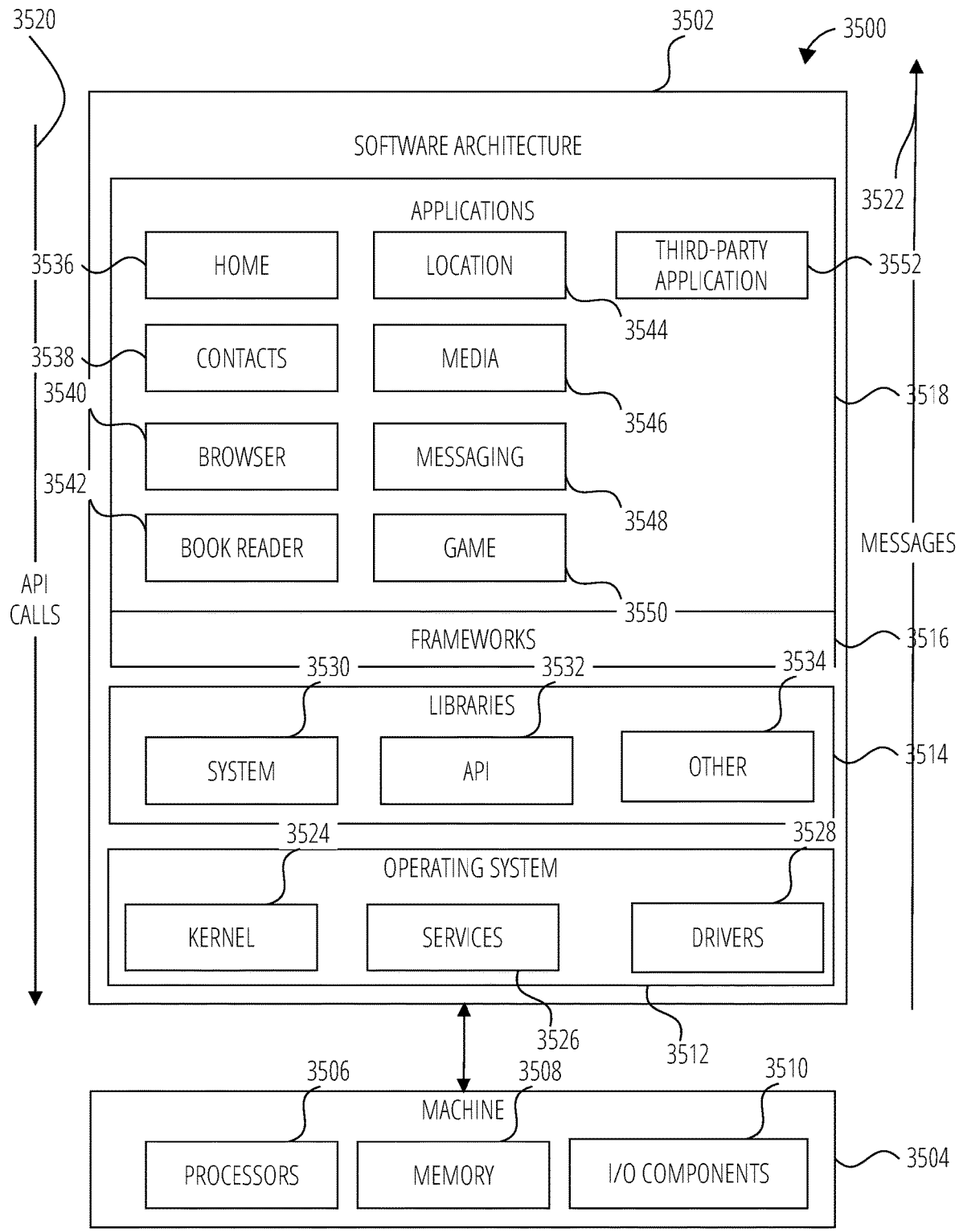
FIG. 35 is a block diagram showing a software architecture within which examples may be implemented.

FIG. 35 is a block diagram 3500 illustrating a software architecture 3502, which can be installed on any one or more of the devices described herein. The software architecture 3502 is supported by hardware such as a machine 3504 that includes processors 3506, memory 3508, and I/O components 3510. In this example, the software architecture 3502 can be conceptualized as a stack of layers, where each layer provides a particular functionality. The software architecture 3502 includes layers such as an operating system 3512, libraries 3514, frameworks 3516, and applications 3518. Operationally, the applications 3518 invoke API calls 3520 through the software stack and receive messages 3522 in response to the API calls 3520.

The operating system 3512 manages hardware resources and provides common services. The operating system 3512 includes, for example, a kernel 3524, services 3526, and drivers 3528. The kernel 3524 acts as an abstraction layer between the hardware and the other software layers. For example, the kernel 3524 provides memory management, processor management (e.g., scheduling), component management, networking, and security settings, among other functionalities. The services 3526 can provide other common services for the other software layers. The drivers 3528 are responsible for controlling or interfacing with the underlying hardware. For instance, the drivers 3528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 3514 provide a common low-level infrastructure used by the applications 3518. The libraries 3514 can include system libraries 3530 (e.g., C standard library) that provide functions such as memory allocation functions, string manipulation functions, mathematic functions, and the like. In addition, the libraries 3514 can include API libraries 3532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 3514 can also include a wide variety of other libraries 3534 to provide many other APIs to the applications 3518.

The frameworks 3516 provide a common high-level infrastructure that is used by the applications 3518. For example, the frameworks 3516 provide various graphical user interface (GUI) functions, high-level resource management, and high-level location services. The frameworks 3516 can provide a broad spectrum of other APIs that can be used by the applications 3518, some of which may be specific to a particular operating system or platform.

In an example, the applications 3518 may include a home application 3536, a contacts application 3538, a browser application 3540, a book reader application 3542, a location application 3544, a media application 3546, a messaging application 3548, a game application 3550, and a broad assortment of other applications such as a third-party application 3552. The applications 3518 are programs that execute functions defined in the programs. Various programming languages can be employed to create one or more of the applications 3518, structured in a variety of manners, such as object-oriented programming languages (e.g., Objective-C, Java, or C++) or procedural programming languages (e.g., C or assembly language). In a specific example, the third-party application 3552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 3552 can invoke the API calls 3520 provided by the operating system 3512 to facilitate functionalities described herein.

Conclusion

The examples provided in present disclosure relate to methods and systems that provides user with computer vision tools for creating three-dimensional (3D) models (or custom landmarkers) usable for augmented reality (AR) experiences out of static features or objects in the world (e.g., building, store fronts, statues). The tools provide at least five user-interactive processes: 3D scanning process, area mapping process, testing process, publishing process, and loading process. In the area mapping process, the creator is instructed to build a map of the custom 3D reference model's area. In the 3D scanning process, the creator is instructed to create a 3D scan of a target structure or object. During scanning, the creator provides feedback as to the quality and completeness of the ongoing scan. After scanning is done, the creator is instructed to test the quality of the scan results (e.g., meshes, perspectives). After finishing the area mapping process and the 3D scanning process, a creator can upload their 3D reference model to a server. The creator may view and load their uploaded model. The creator may also download others' models.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method to facilitate creation of a three-dimensional (3D) model of a reference surface, the method comprising:
   causing a capture device to start a first scan of the reference surface;
   instructing, via a presentation on a graphical user interface (GUI) of a display device, a user to make a first movement during the first scan;
   generating a 3D data representation of the reference surface based on data acquired in the first scan;
   displaying the 3D data representation on the GUI;
   in response to receipt of an acceptance of the 3D data representation from the user, causing the capture device to start a second scan on the reference surface;
   instructing, via a presentation on the GUI, the user to make a second movement during the second scan;
   generating a location tracking data representation of the reference surface based on data acquired in the second scan;
   displaying the location tracking data representation on the GUI; and
   in response to receipt of an acceptance of the location tracking data representation from the user, causing the capture device to generate a 3D model of the reference surface based on the 3D data representation and the location tracking data representation.

2. The method of claim 1, further comprising:
   updating and displaying the 3D data representation of the reference surface during the first scan until a first terminate condition is met, the first terminate condition including at least one of:
   a number of frames captured during the first scan exceeds a first frame threshold; or
   a request to finish the first scan is received from the user.

3. The method of claim 1, further comprising:
   in response to receipt of a rejection of the 3D data representation from the user, discarding the data acquired in the first scan and causing the capture device to restart the first scan.

4. The method of claim 1, further comprising:
   updating and displaying the location tracking data representation of the reference surface during the second scan until a second terminate condition is met, the second terminate condition including at least one of:
   a number of frames captured during the second scan exceeds a second frame threshold; or
   a request to finish the second scan is received from the user.

5. The method of claim 1, further comprising:
   in response to receipt of a rejection of the location tracking data representation of the reference surface, discarding the data acquired in the second scan and causing the capture device to restart the second scan.

6. The method of claim 1, further comprising:
   in response to receipt of a request to cancel during the second scan, deleting the data acquired in the first scan and the data acquired in the second scan and causing the capture device to restart the first scan.

7. The method of claim 1, further comprising:
   enabling, via the GUI, the user to select one or more display parameters of the first scan or the second scan before causing the capture device to start the first scan or the second scan; and
   displaying at least one of the 3D data representation or the location tracking data representation according to the one or more display parameters.

8. The method of claim 1, further comprising:
   in response to receipt of an operation on the GUI of the display device from the user, superimposing a graphical effect on the displayed 3D data representation.

9. The method of claim 1, wherein the instructing the user to make the first movement during the first scan comprises:
   instructing, via the GUI, the user to move around the reference surface;
   measuring a distance from the capture device to the reference surface; and
   based on a determination that the distance from the capture device to the reference surface is not within a distance range, instructing, via the GUI, the user to move to another location.

10. The method of claim 1, wherein the instructing the user to make the second movement during the second scan comprises:
    determining a keyframe corresponding to the reference surface based on the 3D data representation acquired in the first scan;
    determining a location of the user based on the data acquired in the second scan;
    comparing the keyframe with the location of the user to determine that the location of the user meets a predetermined condition; and
    in response to determining that the location of the user meets the predetermined condition, generating the location tracking data representation based on the data acquired in the second scan and instructing, via the GUI, the user to move to another location.

11. The method of claim 10, wherein the instructing the user to make the second movement during the second scan comprises further comprises:
    in response to determining that the location of the user does not meet the predetermined condition, instructing, via the GUI, the user to move to another location.

12. The method of claim 10, wherein the comparing the keyframe with the location of the user to determine whether the location of the user meet the predetermined condition comprises:
    calculating an index based on a vector connecting the reference surface to the keyframe and a vector connecting the reference surface to the location of the user; and
    comparing the index with an index threshold to determine that the location of the user meets the predetermined condition.

13. The method of claim 1, further comprising:
    uploading the 3D model of the reference surface to a server system;
    associating an identifier with the 3D model of the reference surface at the server system; and
    making the 3D model of the reference surface available to further user of the server system using the identifier.

14. The method of claim 13, wherein the making available of the 3D model comprises:
    enabling further user to download the 3D model of the reference surface using the identifier;

instructing, via a GUI of a display device of the further user, to make a movement until the further user is at a location similar to a location of the user; and augment the 3D model with augmentations to create augmented image data superimposed on the reference surface as an augmented reality superimposition.

15. A computing apparatus comprising:

a processor; and a memory storing instructions that, when executed by the processor, configure the apparatus to:

cause a capture device to start a first scan on a reference surface;

instruct, via a presentation on a graphical user interface (GUI) of a display device, a user to make a first movement during the first scan;

generate a 3D data representation of the reference surface based on data acquired in the first scan;

display the 3D data representation on the GUI;

in response to receipt of an acceptance of the 3D data representation from the user, cause the capture device to start a second scan on the reference surface;

instruct, via a presentation on the GUI, the user to make a second movement during the second scan;

generate a location tracking data representation of the reference surface based on data acquired in the second scan;

display the location tracking data representation on the GUI; and in response to receipt of an acceptance of the location track data representation from the user, cause the capture device to generate a 3D model of the reference surface based on the 3D data representation and the location tracking data representation.

16. The computing apparatus of claim 15, wherein the instructions further configure the apparatus to:

update and display the 3D data representation of the reference surface during the first scan until a first terminate condition is met, the first terminate condition including at least one of:

a number of frames captured during the first scan exceeds a first frame threshold; or a request to finish the first scan is received from the user.

17. The computing apparatus of claim 15, wherein the instructions further configure the apparatus to:

in response to receipt of a rejection of the 3D data representation from the user, delete the data acquired in the first scan and causing the capture device to restart the first scan.

18. The computing apparatus of claim 15, wherein the instructions further configure the apparatus to:

in response to receipt of an operation on the GUI of the display device from the user, superimpose a graphical effect on the displayed 3D data representation.

19. The computing apparatus of claim 15, wherein the instructing the user to make the first movement during the first scan comprises:

instruct, via the GUI, the user to move around the reference surface;

measure a distance from the capture device to the reference surface; and based on a determination that the distance from the capture device to the reference surface is not within a distance range, instruct, via the GUI, the user to move to another location.

20. A non-transitory computer-readable storage medium, the computer-readable storage medium including instructions that when executed by a computer, cause the computer to:

cause a capture device to start a first scan on a reference surface;

instruct, via a presentation on a graphical user interface (GUI) of a display device, a user to make a first movement during the first scan;

generate a 3D data representation of the reference surface based on data acquired in the first scan;

display the 3D data representation on the GUI;

in response to receipt of an acceptance of the 3D data representation from the user, cause the capture device to start a second scan on the reference surface;

instruct, via a presentation on the GUI, the user to make a second movement during the second scan;

generate a location tracking data representation of the reference surface based on data acquired in the second scan;

display the location tracking data representation on the GUI; and in response to receipt of an acceptance of the location track data representation from the user, cause the capture device to generate a 3D model of the reference surface based on the 3D data representation and the location tracking data representation.

* * * * *